US011893697B2

United States Patent
Watanabe

(10) Patent No.: US 11,893,697 B2
(45) Date of Patent: *Feb. 6, 2024

(54) APPLICATION CONTROL PROGRAM, APPLICATION CONTROL METHOD, AND APPLICATION CONTROL SYSTEM

(71) Applicant: GREE, INC., Tokyo (JP)

(72) Inventor: Masashi Watanabe, Tokyo (JP)

(73) Assignee: GREE, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/459,724

(22) Filed: Aug. 27, 2021

(65) Prior Publication Data

US 2021/0390788 A1 Dec. 16, 2021

Related U.S. Application Data

(63) Continuation of application No. 16/310,603, filed as application No. PCT/JP2017/037519 on Oct. 17, 2017, now Pat. No. 11,195,335.

(30) Foreign Application Priority Data

Nov. 30, 2016 (JP) .................................. 2016-233012
Jul. 19, 2017 (JP) .................................. 2017-139711

(51) Int. Cl.
*G06T 19/00* (2011.01)
*G02B 27/01* (2006.01)
(Continued)

(52) U.S. Cl.
CPC .......... *G06T 19/006* (2013.01); *A63F 13/212* (2014.09); *A63F 13/2145* (2014.09);
(Continued)

(58) Field of Classification Search
None
See application file for complete search history.

(56) References Cited

U.S. PATENT DOCUMENTS 8,963,916 B2 * 2/2015 Reitan ..................... G06F 3/011
345/419
2011/0050595 A1 * 3/2011 Lundback ............. G06F 3/0425
345/173
(Continued)

FOREIGN PATENT DOCUMENTS

EP 1726342 A2 11/2006
JP 2004-089555 A 3/2004
(Continued)

OTHER PUBLICATIONS

Akiro, Lance. (Jul. 7, 2017). PSVR I The Playroom VR: Ghost House [Video]. Youtube. http://www.youtube.com/watch?v=7wXqB7MIBTE (Year: 2017).
(Continued)

*Primary Examiner* — Kee M Tung
*Assistant Examiner* — Jed-Justin Imperial
(74) *Attorney, Agent, or Firm* — Oliff PLC

(57) ABSTRACT

A controller outputs an image of the virtual space in correspondence with a posture of a first user wearing the mounted display, outputs an image of the virtual space to a touch panel display used by a second user, performs a first action in the virtual space in correspondence with a touch operation performed by the second user on the touch panel display, outputs an image of the virtual space reflecting the first action to the mounted display, and performs a second action in the virtual space reflecting the first action in correspondence with an operation performed by the first user on an operation unit.

13 Claims, 9 Drawing Sheets

(51) Int. Cl.

| | |
|---|---|
| *G06F 3/04883* | (2022.01) |
| *G06F 3/0482* | (2013.01) |
| *G06F 3/01* | (2006.01) |
| *G06F 3/04815* | (2022.01) |
| *A63F 13/25* | (2014.01) |
| *A63F 13/2145* | (2014.01) |
| *A63F 13/52* | (2014.01) |
| *A63F 13/212* | (2014.01) |
| *A63F 13/843* | (2014.01) |
| *A63F 13/847* | (2014.01) |
| *G06F 3/0488* | (2022.01) |

(52) U.S. Cl.
CPC ............. *A63F 13/25* (2014.09); *A63F 13/52* (2014.09); *A63F 13/843* (2014.09); *A63F 13/847* (2014.09); *G02B 27/017* (2013.01); *G06F 3/011* (2013.01); *G06F 3/012* (2013.01); *G06F 3/013* (2013.01); *G06F 3/017* (2013.01); *G06F 3/0482* (2013.01); *G06F 3/0488* (2013.01); *G06F 3/04815* (2013.01); *G06F 3/04883* (2013.01)

(56) References Cited

U.S. PATENT DOCUMENTS

| | | | |
|---|---|---|---|
| 2012/0086630 A1 | 4/2012 | Zhu et al. | |
| 2012/0106041 A1 | 5/2012 | Ashida et al. | |
| 2013/0324238 A1 | 12/2013 | Akifusa et al. | |
| 2014/0073386 A1* | 3/2014 | Aoki ................... | G07F 17/3206 463/31 |
| 2015/0002512 A1 | 1/2015 | Iwamoto et al. | |
| 2015/0163473 A1 | 6/2015 | Osawa et al. | |
| 2016/0048286 A1 | 2/2016 | Picon et al. | |
| 2016/0252729 A1 | 9/2016 | Doucet et al. | |
| 2017/0024935 A1 | 1/2017 | Baba | |
| 2018/0096519 A1 | 4/2018 | Tokubo | |

FOREIGN PATENT DOCUMENTS

| | | |
|---|---|---|
| JP | 2012-96027 A | 5/2012 |
| JP | 2012-232024 A | 11/2012 |
| JP | 2013-248108 A | 12/2013 |
| JP | 2014-17776 A | 1/2014 |
| JP | 2014-188296 A | 10/2014 |
| JP | 2016-19572 A | 2/2016 |
| JP | 2016-101299 A | 6/2016 |
| JP | 2016-158795 A | 9/2016 |
| JP | 2016-173698 A | 9/2016 |
| KR | 10-2016-0049468 A | 5/2016 |
| WO | 2016/084941 A1 | 6/2016 |

OTHER PUBLICATIONS

Japanese Office Action dated Oct. 20, 2020 in Japanese Patent Application No. 2019-182013 (with unedited computer generated English translation), 6 pages.
Decision of Refusal dated Jun. 2, 2020 in corresponding Japanese Patent Application No. 2018-112847 (with English Translation), 2 pages.
Decision of Dismissal of Amendment dated Jun. 2, 2020 in corresponding Japanese Patent Application No. 2018-112847 (with English Translation), 4 pages.
Office Action dated Jul. 20, 2021 in Japan Patent Application No. 2018-112847 (with English-language translation): 41 pgs.
Notice of Termination of Reconsideration by Examiners before Appeal Proceedings and Reconsideration Report by Examiner before Appeal issued Dec. 1, 2020 for Japan Patent Application No. 2018-112847/Appeal or trial No. Appeal 2020-012323 (with English translation): 6 pgs.
Extended European Search Report dated Apr. 29, 2020 in corresponding European Patent Application No. 17875091.5, 11 pages.
Simon Fitzgerald: "The Playroom VR Review (PS4)", XP055686346, Oct. 25, 2016, 23 pages Retrieved from the Internet: URL:http://www.pushsquare.com/reviews/ps4/the_playroom_vr [retrieved on Apr. 16, 2020].
Japanese Office Action dated Oct. 23, 2019 in Japanese Patent Application No. 2018-112847 (with unedited computer generated English translation), 7 pages.
Japanese Office Action dated Apr. 2, 2019, in Patent Application No. 2018-112848, 8 pages (with English translation).
Japanese Office Action dated Apr. 2, 2019, in Patent Application No. 2018-112847, 6 pages (with English translation).
International Search Report dated Nov. 21, 2017 in PCT/JP2017/037519, filed on Oct. 7, 2017.
Jul. 20, 2021 Office Action issued in Japanese Patent Application No. 2018-112847.
Jun. 30, 2021 Office Action issued in Chinese Patent Application No. 201780038499.7.
Sep. 17, 2021 Office Action issued in European Patent Application No. 17875091.5.
Oct. 5, 2021 Office Action issued in Japanese Patent Application No. 2018-112847.
Aug. 8, 2023 Summons to Attend Oral Proceedings issued in European Patent Application No. 17875091.5.
Anonymous: "PlayStation VR Wikipedia" <https://en.wikipedia.org/w/index.php?title=PlayStation_VR&oldid=752179446> (Nov. 29, 2016).

\* cited by examiner

APPLICATION CONTROL PROGRAM, APPLICATION CONTROL METHOD, AND APPLICATION CONTROL SYSTEM

CROSS-REFERENCE TO RELATED APPLICATION(S)

This application is a continuation of U.S. application Ser. No. 16/310,603 filed Dec. 17, 2018, which is a National Stage of PCT/JP2017/037519 filed Oct. 17, 2017, and which is based on and claims priority under 35 U.S.C. 119 from Japanese Patent Application No. 2017-139711 filed Jul. 19, 2017 and Japanese Patent Application No. 2016-233012 filed Nov. 30, 2016. The entire contents of the above applications are incorporated herein by reference.

TECHNICAL FIELD

The present application relates to an application control program, an application control method, and an application control system that allow a plurality of users to share virtual space.

BACKGROUND

When a virtual reality game is played, an image of virtual space is displayed on a mounted display worn on the head of a user (hereinafter referred to as head-mounted display (HMD)). The HMD includes a tracking sensor such as a gyro sensor and can detect motion of the head of the user. When the user moves the head, the HMD changes the image to be displayed on the display so that the image follows the motion of the head. In this manner, when the image of the game follows the motion of the head, the user can further concentrate on the game. That is, the sense of immersion in the game is increased.

Further, a game played by multiple users has also been proposed as one of the virtual reality games described above. Patent document 1 describes a game played by multiple users wearing HMDs. In this game, the position information of each user wearing the HMD is reflected on the position information of an avatar in virtual space to render the avatar of each user in the virtual space.

PRIOR ART DOCUMENT

Patent Document

Patent Document 1: Japanese Laid-Open Patent Publication No. 2014-17776

SUMMARY

Problems that are to be Solved

When multiple users play a virtual reality game, there may not be enough HMDs for all of the users to play the game. In addition, there may be a user who does not want to wear the HMD. In this manner, various situations can be expected. However, there appears to be no game in which a user who is wearing the HMD and a user who is not wearing the HMD can both participate and contribution to an application by the user who is not wearing the HMD can be increased.

It is an object of the present application to provide an application control program, an application control method, and an application control system in which a user who is wearing a mounted display and a user who is not wearing a mounted display can cooperate to play in virtual space.

Means for Solving the Problem

One aspect provides an application control program that uses a controller that outputs an image to a mounted display worn by a user to output an image of virtual space. The program causes the controller to function as means for outputting an image of the virtual space in correspondence with a posture of a first user wearing the mounted display, outputting an image of the virtual space to a touch panel display used by a second user, performing a first action in the virtual space in correspondence with a touch operation performed by the second user on the touch panel display, outputting an image of the virtual space reflecting the first action to the mounted display, and performing a second action in the virtual space reflecting the first action in correspondence with an operation performed by the first user on an operation unit.

Another aspect provides a method for controlling an application that uses a controller that outputs an image to a mounted display worn by a user to output an image of virtual space. In the method, the controller performs outputting an image of the virtual space in correspondence with a posture of a first user wearing the mounted display, outputting an image of the virtual space to a touch panel display used by a second user, performing a first action in the virtual space in correspondence with a touch operation performed by the second user on the touch panel display, outputting an image of the virtual space reflecting the first action to the mounted display, and performing a second action in the virtual space reflecting the first action in correspondence with an operation performed by the first user on an operation unit.

Still another aspect provides application control system. The system includes a controller that outputs an image to a mounted display worn by a user. In the system, the controller performs outputting an image of the virtual space in correspondence with a posture of a first user wearing the mounted display, outputting an image of the virtual space to a touch panel display used by a second user, performing a first action in the virtual space in correspondence with a touch operation performed by the second user on the touch panel display, outputting an image of the virtual space reflecting the first action to the mounted display, and performing a second action in the virtual space reflecting the first action in correspondence with an operation performed by the first user on an operation unit.

Yet another aspect provides an application control program that uses a controller that outputs an image to a mounted display worn by a user to output an image of virtual space. The program causes the controller to function as means for outputting an image of the virtual space in correspondence with a posture of a first user wearing a first display, outputting an image of the virtual space to a second display, performing a first action in the virtual space in correspondence with an operation performed by the second user on a first operation unit, outputting an image of the virtual space reflecting the first action to the first display, and performing a second action in the virtual space reflecting the first action in correspondence with an operation performed by the first user on a second operation unit.

A further aspect provides a method for controlling an application that uses a controller that outputs an image to a mounted display worn by a user to output an image of virtual space. The method causes the controller to function as means for outputting an image of the virtual space in correspondence with a posture of a first user wearing a first display, outputting an image of the virtual space to a second display, performing a first action in the virtual space in correspondence with an operation performed by the second user on a first operation unit, outputting an image of the virtual space reflecting the first action to the first display, and performing a second action in the virtual space reflecting the first action in correspondence with an operation performed by the first user on a second operation unit.

A still further aspect provides an application control system that uses a controller that outputs an image to a mounted display worn by a user to output an image of virtual space. The system causes the controller to function as means for, outputting an image of the virtual space in correspondence with a posture of a first user wearing the first display, outputting an image of the virtual space to a second display, performing a first action in the virtual space in correspondence with an operation performed by the second user on a first operation unit, outputting an image of the virtual space reflecting the first action to the first display, and performing a second action in the virtual space reflecting the first action in correspondence with an operation performed by the first user on a second operation unit.

DETAILED DESCRIPTION OF THE DRAWINGS

First Embodiment

One embodiment of an application control program, an application control method, and an application control system will now be described with reference to FIGS. 1 to 10. In the present embodiment, it is assumed that a game application is provided as an application in which virtual space is shared by multiple users.

Figure 1:
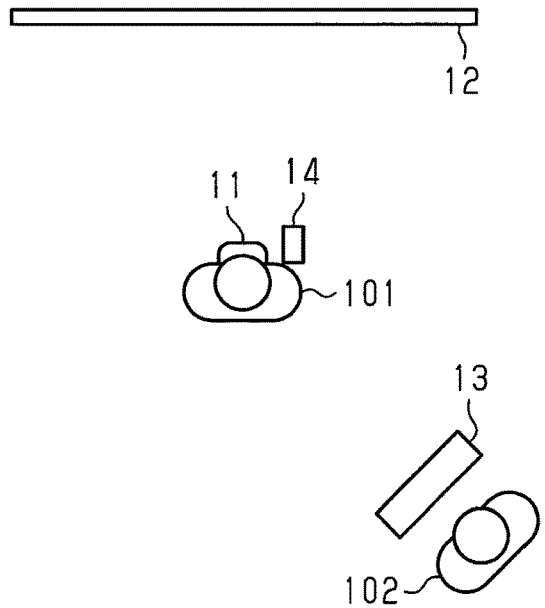
FIG. 1 is a schematic diagram showing a first embodiment of an application control system from above.

As shown in FIG. 1, the application control system includes a head-mounted display (hereinafter referred to as HMD) 11 serving as a mounted display, an operation unit (controller) 14, a main display 12, and a touch panel display 13. The HMD 11 is worn on the head of a first user 101. The HMD 11 displays an image of the virtual space. The first user 101 searches for an object moving in the virtual space (hereinafter referred to as moving object) and performs an action (second action) on the found moving object by operating the operation unit 14. In the present embodiment, the first user 101 searches for a moving object such as a "ghost" and shoots the moving object by on-operating the operation unit 14.

Images output to the main display 12 and the touch panel display 13 are visually recognized by a second user 102. The second user 102 operates the touch panel display 13 to assist the first user 101 while visually recognizing the images output to the main display 12 and the touch panel display 13. The second user 102 may be able to inform the first user 101 of the position of a moving object via an unamplified voice or voice input to a microphone.

Figure 2:
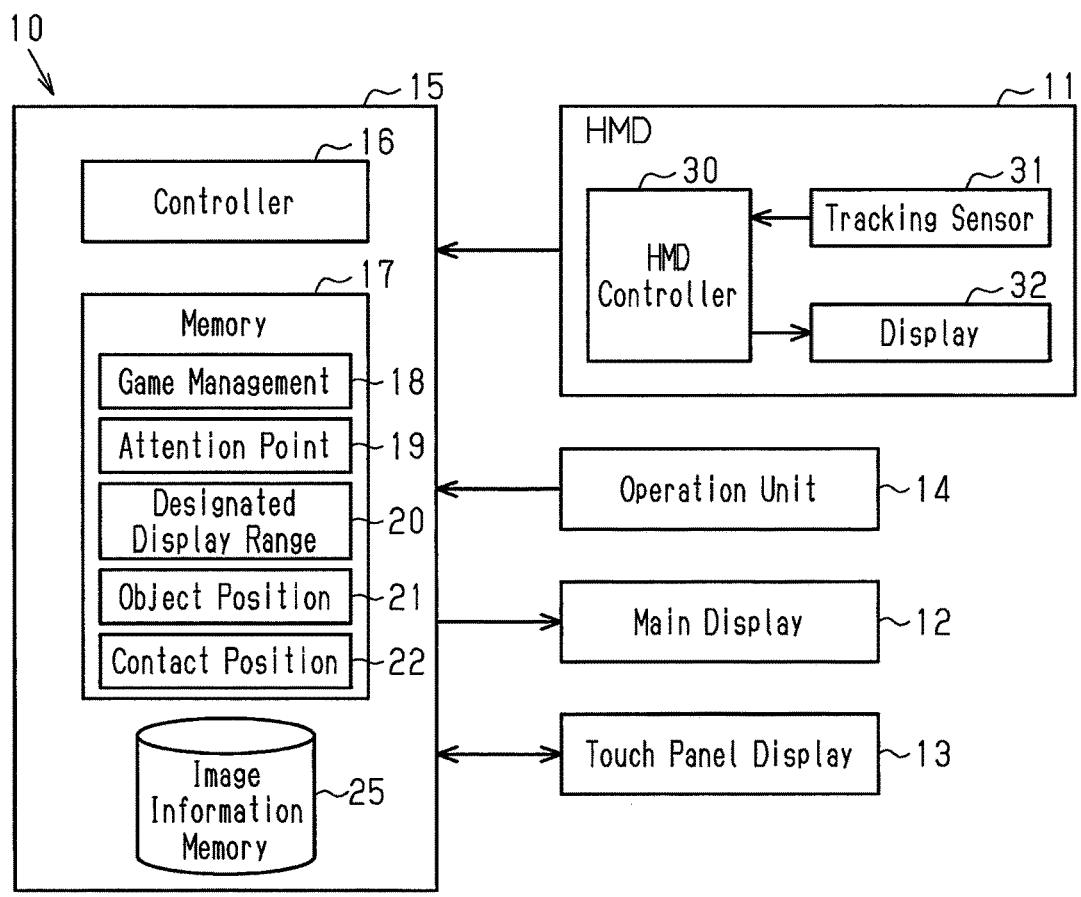
FIG. 2 is a functional block diagram showing the application control system of FIG. 1.

The schematic configuration of the application control system 10 will now be described with reference to FIG. 2. The application control system 10 includes the HMD 11, the operation unit 14, the main display 12, the touch panel display 13, and a control device 15 connected to these components.

The HMD 11 includes an HMD controller 30, a tracking sensor 31, and a display 32. The HMD controller 30 outputs a signal corresponding to a detection result of the tracking sensor 31 to the control device 15 and receives various signals such as an image signal input from the control device 15. The tracking sensor 31 is a sensor that determines an attention point of the first user 101 and detects, for example, the position and orientation of the head of the first user 101. The tracking sensor 31 includes, for example, at least one of a gyro sensor, an acceleration sensor, and a geomagnetic sensor. As another embodiment, a sensor that directly detects the eye motion of the first user 101, for example, a sight line detection sensor, which emits near-infrared rays to an iris and detects its reflected light, may be used as the tracking sensor 31. The display 32 of the HMD 11 displays an image of a predetermined range of the virtual space centered about the attention point of the first user 101. That is, the image of the predetermined range is displayed to be visually recognized by the first user 101. The image of the virtual space output to the display 32 of the HMD 11 is hereinafter referred to as the "first virtual space image."

The operation unit 14 includes, for example, an operation button and an operation lever and is configured to be operable without the first user 101 looking at the operation unit 14. The operation unit 14 includes an acceleration sensor or the like and can detect, for example, a change in a direction from an initial position and the amount of the change. The operation unit 14 outputs, to the control device 15, a signal indicating an on/off-operation by the second user 102, the change amount in the direction of the operation unit 14, and the like.

The main display 12 is a display that can be visually recognized by the second user 102. The main display 12 displays the first virtual space image in synchronization with the display 32 of the HMD 11.

The touch panel display 13 may be a touch panel display arranged on a housing or a mobile information terminal such as a tablet or a smartphone. An image of projection of a part in the virtual space (hereinafter referred to as the second virtual space image) is output to the touch panel display 13. In the present embodiment, an image (bird's-eye view image) taken by viewing the inside of the virtual space from a viewpoint set at a position located upward in the vertical direction from the first user 101 is used as the second virtual space image. The initial view of the second virtual space image, which is displayed on the touch panel display 13 when a game is started, is taken from a viewpoint at a position that is the same as the position of the virtual space projected on the first virtual space image, which is displayed on the display 32 of the HMD 11. The viewpoint position of the second virtual space image in the initial view may be the same as or different from the viewpoint position of the first virtual space image in the initial view. The position where the virtual space is projected on the second virtual space image is varied and designated in correspondence with a predetermined touch operation such as a swipe operation performed by the second user 102. For example, the swipe operation performed by the second user 102 varies the projection range of the virtual space to change the second virtual space image, and, when the swipe operation is stopped, it stops varying the projection range of the virtual space and designates the display range of the second virtual space image. The "touch operation" includes, for example, a tap operation, a swipe operation, a flick operation, a pinch-in operation, a pinch-out operation, and a touch-and-hold operation. Further, the touch panel display 13 outputs a signal corresponding to a touch operation performed by the second user 102 to the control device 15. For example, the touch panel display 13 outputs a signal corresponding to the path of a swipe operation, a signal corresponding to a contact position, and the like.

The first virtual space image output to the display 32 of the HMD 11 and the second virtual space image output to the touch panel display 13 are images in the same virtual space. However, the first virtual space image differs from the second virtual space image in that the display range of the virtual space is varied in correspondence with the posture of the first user 101 in the first virtual space image, whereas the display range of the virtual space is varied in correspondence with a touch operation performed by the second user 102 in the second virtual space image. In addition, the touch panel display 13 displays a bird's-eye view image that is a bird's-eye view of the virtual space taken from a predetermined position.

The control device 15 obtains signals output from the HMD 11, the operation unit 14, and the touch panel display 13 and manages progress of the game made in the virtual space by the first user 101 and the second user 102.

The control device 15 includes a controller 16, a memory 17, and an image information memory 25. The controller 16 includes a calculator, a volatile memory, and a non-volatile memory and executes the game in accordance with the application control program recorded in the non-volatile memory. The memory 17 is an image processing memory and may be a volatile memory or a non-volatile memory. The memory 17 records game management information 18, attention point information 19, designated display range information 20, object position information 21, and contact position information 22.

The game management information 18 includes, for example, user ID and game progress state and is updated as the game progresses. The attention point information 19 is information of the position and orientation of the head of the first user 101 detected by the tracking sensor 31 or information indicating the position of the attention point identified from the position and orientation of the head. The attention point information 19 is updated with the position and orientation of the head of the first user 101. The designated display range information 20 indicates the range displayed on the touch panel display 13 through a touch operation performed by the second user 102 and is updated with the touch operation performed by the second user 102. The object position information 21 indicates the positions of moving objects that move in the virtual space. The controller 16 randomly moves each moving object in accordance with the application control program. The object position information 21 is updated as the position of each moving object changes. For a moving object, the position in the first virtual space image output to the HMD 11 and the main display 12 is synchronized with the position in the second virtual space image output to the touch panel display 13. In addition, the contact position information 22 indicates the contact position on the screen of the touch panel display 13 and is updated with each touch operation performed by the second user 102. Further, the image information memory 25 records information that is used to render an image of the virtual space.

The controller 16 records, in the memory 17, the attention point information 19 based on a signal input from the HMD 11. Further, the controller 16 records, in the memory 17 as the designated display range information 20, a signal corresponding to the designated display range input from the touch panel display 13.

From the image information recorded in the image information memory 25, the controller 16 obtains image information of a predetermined range centered about the attention point based on the attention point information 19 and outputs the obtained image information to the HMD 11 and the main display 12 as the first virtual space image. Further, the controller 16 records, in the memory 17, a designated display range designated by a touch operation performed by the second user 102 as the designated display range information 20. The controller 16 obtains image information from the image information memory 25 based on the designated display range information 20 and outputs the obtained image information to the touch panel display 13 as the second virtual space image. Additionally, the controller 16 outputs a bird's-eye view image that is a bird's-eye view of part of or all of the virtual space to the touch panel display 13.

Figure 3:
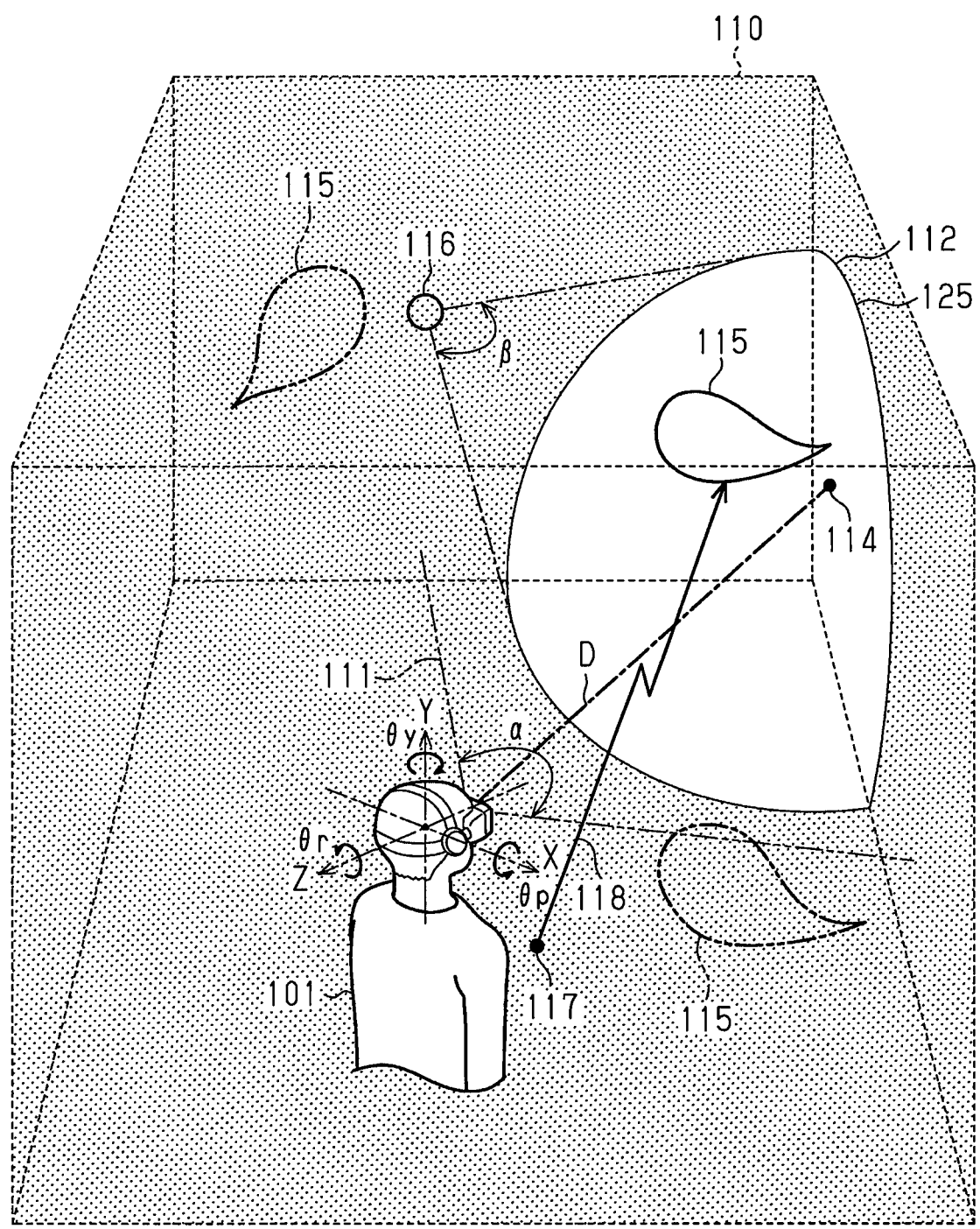
FIG. 3 is a schematic diagram illustrating virtual space and an image that is visually recognized by a user in the application control system of FIG. 1.

The virtual space and the first virtual space image, which is output to the HMD 11 and the main display 12, will now be described with reference to FIG. 3. The HMD controller 30 determines the position and orientation of the head of the first user 101. For example, using the initial position as a reference, the position and orientation of the head are calculated as positions in three axial directions and angles about the three axes, namely, an X-axis extending in the horizontal direction, a pitch θp indicating the rotation direction about the X-axis, a Y-axis extending in the vertical direction, a yaw θy indicating the rotation direction about the Y-axis, a Z-axis extending in the forward direction, and a roll θr indicating the rotation direction about the Z-axis. The HMD controller 30 outputs the positions in the three axial directions and the angles about the axes to the controller 16 as the attention point information 19.

The controller 16 determines the attention point 114 or a sight line direction D in the virtual space 110 based on the attention point information 19. The method employed to determine the attention point or the sight line direction may be a known method that corresponds to, for example, the type of the tracking sensor 31. For example, the controller 16 virtually sets a straight line that connects a left eye position to a right eye position and sets a direction that extends orthogonal to the straight line and through the center point of the left eye position and the right eye position as the sight line direction D. Further, the controller 16 can determine the intersection of the sight line direction D and an object (or background) as the attention point 114. When a sensor that detects eye motion or a sensor that detects reflected light from the inside of the iris is used as the tracking sensor, the sight line direction may be determined based on the eye motion or the reflected light.

The controller 16 obtains image information of an attention range ill, which is a range based on the attention point 114 or the sight line direction D, from the image information memory 25 and outputs the image information to the display 32 of the HMD 11 as the first virtual space image. For example, when the direction extending from the viewpoint of the first user 101 toward the attention point 114 is set as the sight line direction D, the attention range 111 is a range identified by, for example, a horizontal viewing angle α in the horizontal direction centered about the sight line direction D and a vertical viewing angle (not shown) that is an angle in the vertical direction. The horizontal viewing angle α and the vertical viewing angle refer to rendering angles that generate images of the virtual space 110 and do not refer to physical viewing angles of the first user 101. The controller 16 also outputs an image corresponding to the obtained image information to the main display 12.

The entire virtual space is displayed in an initial state in the first virtual space image displayed on the HMD 11 and the first virtual space image displayed on the main display when a predetermined action is not performed on the images. For example, the initial state is "darkness," that is, a state in which the brightness and saturation of the images is low. The first virtual space image in the initial state displays moving objects 115, which move in the virtual space, in a non-displayed state. In the non-displayed state, the moving objects are not displayed at all or are displayed in an unclear state and difficult to visually recognize. The unclear displayed state is, for example, a state in which the moving object 115 is only partially displayed and not entirely displayed or a state in which at least one of the brightness, saturation, and hue of the moving object 115 is close to that of the background to obscure the moving object 115. Further, for example, the second user 102 is displayed in the virtual space as a character 116 such as a drone or an avatar. In the present embodiment, the position of the character 116 is kept at a position located upward in the vertical direction from the first user 101.

In addition, when a display range is designated by a touch operation on the touch panel display 13 by the second user 102, the controller 16 obtains the designated display range from the touch panel display 13 and stores the designated display range in the memory 17 as the designated display range information 20. Further, the controller 16 outputs, to the touch panel display 13, a designated display range 112 corresponding to the designated display range information 20 as the second virtual space image in a display mode that differs from that of the initial state of the first virtual space image. More specifically, the display mode is a varied state in which at least one of the brightness, saturation, and hue differs from that of the initial state. The varied state is, for example, a state with light irradiation, that is, a state in which the brightness is higher than that of the initial state and the saturation and hue differ from those of the initial state. The controller 16 displays a moving object in the second virtual space image as being visually recognizable based on the object position information 21. This allows the second user to visually recognize the moving object on the second virtual space image.

Further, when the attention range 111 of the first user 101 overlaps with at least a part of the designated display range 112 designated by the second user 102, the controller 16 displays the overlapped portion of the first virtual space image in the varied state, which differs from the initial state. More specifically, the overlapped portion is displayed in a state in which at least one of the brightness, saturation and hue differs from that of the other portion. FIG. 3 shows a state in which the attention range 111 includes the entire designated display range 112. In the first virtual space image, light is displayed as being irradiated from the character 116 or from a light source the character 116 has.

The controller 16 designates the designated display range 112, which is designated by the second user 102, in the virtual space 110 (first action) to reflect the first action on the first virtual space image. More specifically, in the first virtual space image, the controller 16 sets only a moving object 115 included in a portion where the attention range is overlapped with the designated display range 112 (overlapped range in virtual space) to a displayed state (visually recognizable state) and sets a moving object 115 that exists in the other portion that is not the overlapped portion to a non-displayed state (non-visually recognizable state). Thus, the first user 101 can visually recognize a moving object 115 only when the attention range 111 is overlapped with the designated display range 112 and the moving object 115 is included in the overlapped portion.

Further, in the present embodiment, the designated display range 112 designated by the second user 102, in other words, a horizontal viewing angle β of the projected range in the virtual space that generates the second virtual space image, is smaller than the horizontal viewing angle α of the projected range in the virtual space that generates the first virtual space image. That is, when the horizontal viewing angle β of the second virtual space image is greater than or equal to the horizontal viewing angle α of the first virtual space image, it facilitates finding of the designated display range 112 reflected on the first virtual space image by the first user 101. In contrast, when the horizontal viewing angle β of the second virtual space image is smaller than the horizontal viewing angle α of the first virtual space image, it obstructs finding of the designated display range 112 reflected on the first virtual space image by the first user 101. The ratio of the horizontal viewing angle of the second virtual space image to the horizontal viewing angle α of the first virtual space image can be determined in correspondence with a target game balance. In the present embodiment, the horizontal viewing angle β of the second virtual space image is set to be smaller than the horizontal viewing angle α of the first virtual space image. This increases the contribution of the second user 102 to the game and allows the first user 101 and the second user 102 to cooperate in order for the game to progress.

In addition, the second user 102 can perform a predetermined touch operation on the touch panel display 13 to stop moving a moving object 115 displayed proximate to the contact position. The second user 102 performs a touch-and-hold operation that keeps a finger in contact with a certain position on the screen. When the touch-and-hold operation is performed, as the first action, the controller 16 identifies a moving object displayed in a predetermined distance from the contact position and stops movement (motion) of the identified moving object 115. That is, motion of the single moving object 115 closest to a single contact position is stopped. For example, when five moving objects 115 exist in the virtual space 110 and the user wants to stop their movement, the user performs the touch-and-hold operation using five fingers (or at five contact points).

Further, the first user 101 can perform the second action only on a moving object 115 that is visually recognizable in the designated display range 112. In the present embodiment, the first user 101 shoots the moving object 115 as the second action. When movement of the moving object 115 is stopped by the touch operation performed by the second user 102, the first user 101 can easily aim at the moving object 115 and easily performs a valid second action. More specifically, when the controller 16 detects an on-operation performed on the operation unit 14, the controller 16 causes a beam 118 to be displayed in the first virtual space image and the second virtual space image in the direction of the operation unit 14 from a virtual position 117 of the operation unit 14. When the direction of the beam 118 corresponds to the position of the moving object 115 in the virtual space, the controller 16 determines that the second action has been validly performed. More specifically, the controller 16 determines that the moving object 115 has been shot and gives points or the like to the first user 101. The controller 16 does not cause the beam 118 for action to be displayed for a moving object 115 that is not included in the designated display range 112. Alternatively, when the beam 118 for action is emitted toward the moving object 115 that is not included in the designated display range 112, the controller 16 may determine that the action is invalid. The controller 16 causes the beam 118 for action to be displayed on the display 32 of the HMD 11, the main display 12, and the touch panel display 13.

Views displayed on the display 32 of the HMD 11, the main display 12, and the touch panel display 13 will now be described with reference to FIGS. 4 to 8.

Figure 4:
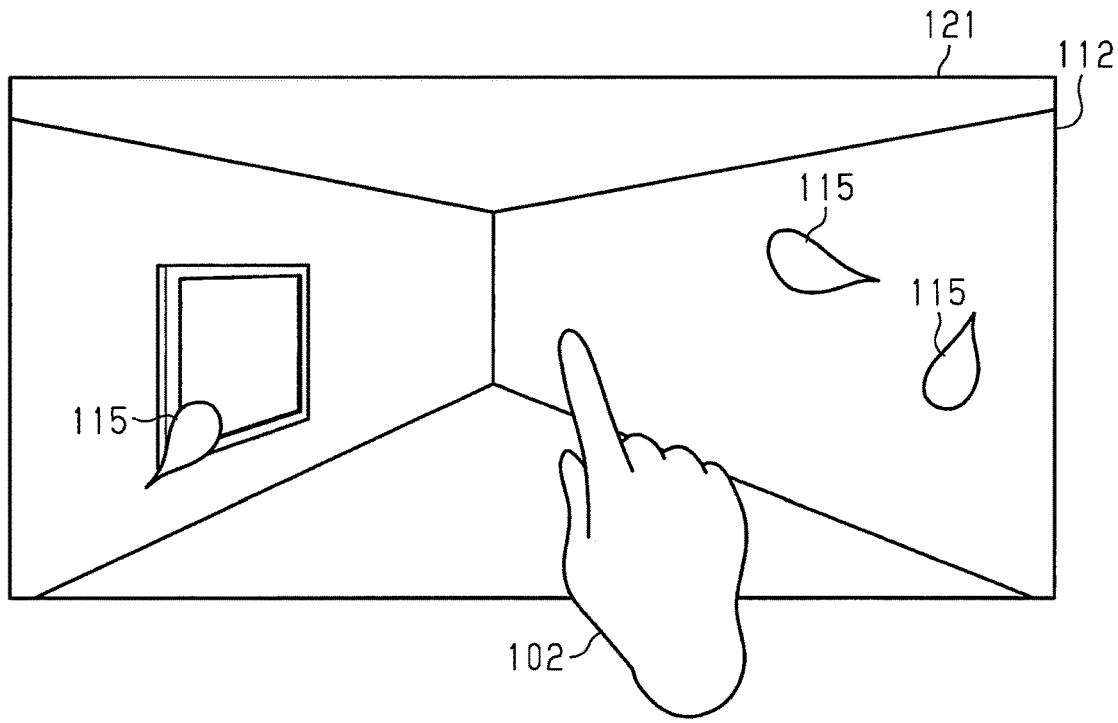
FIG. 4 is a diagram illustrating a second virtual space image output to the touch panel display shown in FIG. 1.

As shown in FIG. 4, the controller 16 generates image information to render image information of the virtual space recorded in the image information memory 25 in correspondence with the designated display range 112 to display a second virtual space image 121. The controller 16 further adjusts the generated image information in brightness, saturation, and hue for the second virtual space image 121, and outputs the generated image information to the touch panel display 13. Even when the second virtual space image 121 displays the same range as the first virtual space image, the second virtual space image 121 differs from the initial state of the first virtual space image in at least one of brightness, saturation, and hue. More specifically, the controller 16 causes the entire second virtual space image 121 to be displayed with a high brightness as if irradiated with light. Further, the controller 16 causes a moving object 115 that moves based on the object position information 21 to be displayed in the second virtual space image 121. However, the moving object 115 moves randomly. Thus, when the designated display range 112 is not varied, the moving object 115 that was initially displayed may move out of the screen. The second user 102 performs, for example, a swipe operation to vary the designated display range 112 and shift the view and searches for the moving object 115 in order to inform the first user 101 of the position of the moving object 115.

Figure 5:
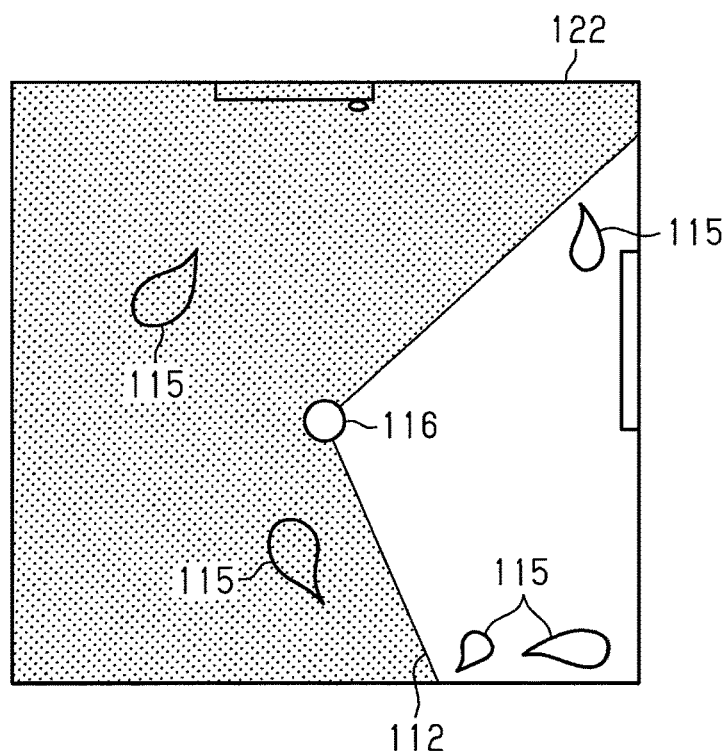
FIG. 5 is a diagram illustrating a bird's-eye view image output to the touch panel display of FIG. 1.

As shown in FIG. 5, the controller 16 outputs a bird's-eye view image 122 to the touch panel display 13 by obtaining image information for a bird's-eye view image recorded in the image information memory 25 or rendering image information of the virtual space. The bird's-eye view image 122 is an image of the entire virtual space taken from above and displays, for example, the position of the character 116. The controller 16 causes the designated display range 112 of the bird's-eye view image 122 designated by the second user 102 to be displayed in a varied state as if irradiated with light and causes the other portion to be displayed in the initial state such as in darkness. Further, the controller 16 causes the moving object 115 to be displayed in the bird's-eye view image 122.

Figure 6:
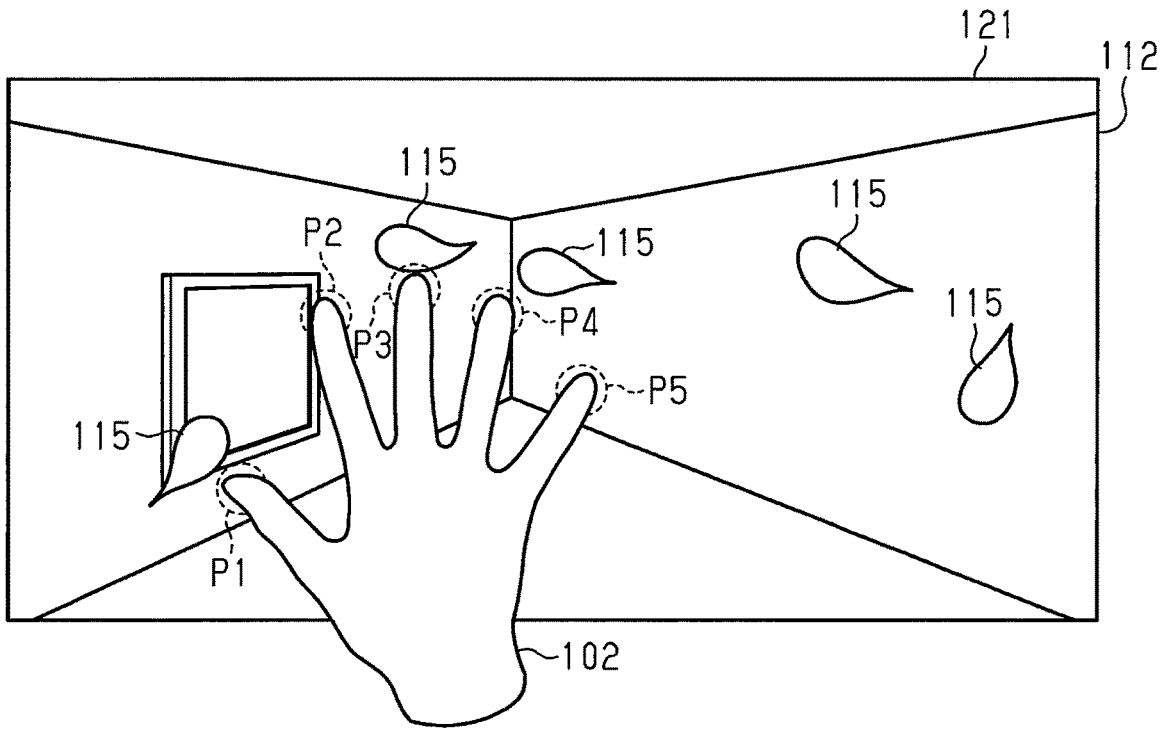
FIG. 6 is a diagram illustrating the second virtual space image output to the touch panel display of FIG. 1.

As shown in FIG. 6, when the second user 102 performs a touch-and-hold operation in the second virtual space image 121 displayed on the touch panel display 13, the controller 16 identifies a moving object 115 displayed within a predetermined distance from the contact position of a finger and stops moving the identified moving object 115. In FIG. 6 the controller 16 stops movement of moving objects 115 displayed on portions where the relative distances from contact positions P1, P3 and P4 are within predetermined distances. The controller 16 cannot identify a moving object 115 displayed proximate to a contact position P2 and thus does not stop the moving object 115. Accordingly, the controller 16 does not stop moving the moving objects 115 in the right side of the drawing that are displayed in the portion where the relative distance from a contact position P5 exceeds a predetermined distance.

Figure 7:
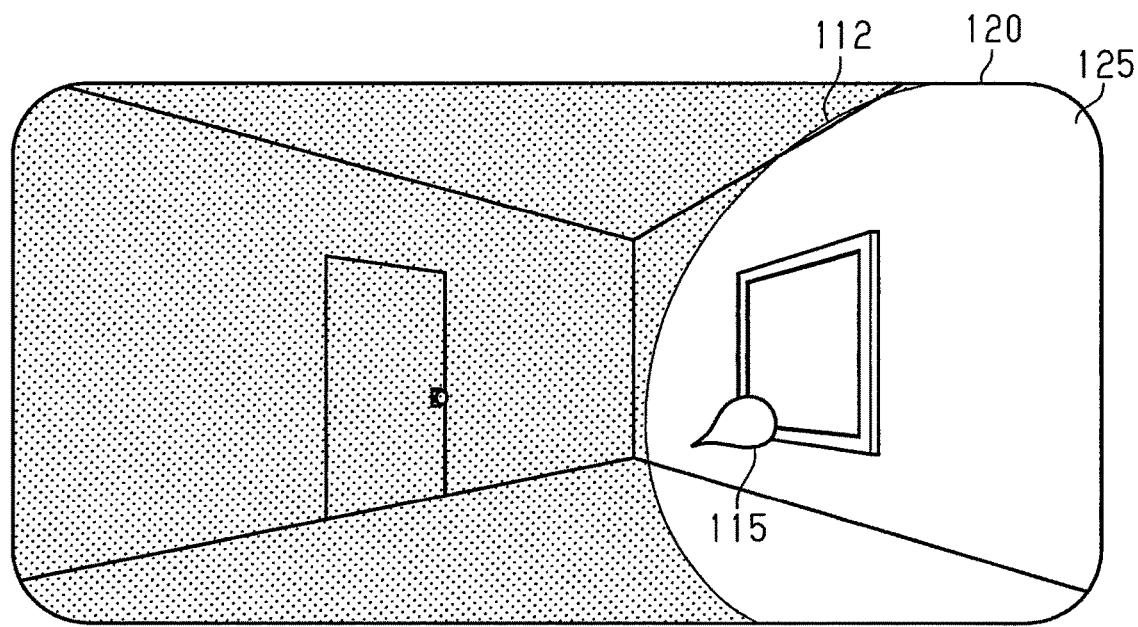
FIG. 7 is a diagram illustrating a first virtual space image output to the mounted display shown in FIG. 1.

As shown in FIG. 7, the controller 16 outputs a first virtual space image 120 to the display 32 of the HMD 11 and changes the display range in correspondence with the posture of the first user 101. When the controller 16 determines that the attention range 111 of the first user 101 is overlapped with the designated display range 112 designated by the second user 102, the controller 16 causes the overlapped portion 125 of the attention range 111 and the designated display range 112 to be displayed in the varied state as if irradiated with light. Further, the controller 16 causes the other portion of the first virtual space image 120 that is not the overlapped portion 125 to be displayed in the initial state such as in darkness. In addition, when the moving objects 115 are included in the overlapped portion 125, the controller 16 causes only the moving objects 115 included in the overlapped portion 125 to be displayed and does not cause moving objects 115 that are not included in the overlapped portion 125 to be displayed.

Figure 8:
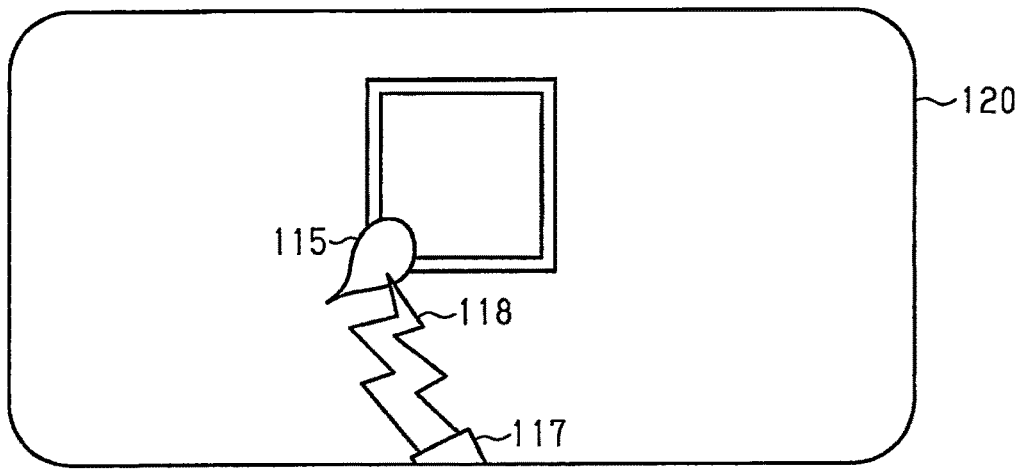
FIG. 8 is a diagram illustrating the first virtual space image output to the touch panel display of FIG. 1.

As shown in FIG. 8, when a signal corresponding to an on-operation is input from the operation unit 14, the controller 16 reflects the second action on the first virtual space image 120 and outputs the first virtual space image 120 reflecting the second action to the display 32 of the HMD 11. For example, based on a signal that detects the direction of the operation unit 14 output from the operation unit 14, the controller 16 causes the beam 118 to be displayed from the virtual position 117 of the operation unit 14 in the virtual space in the direction of the operation unit 14. When a moving object 115 exists in the direction of the beam 118, the controller 16 validates shooting, which is the second action. Though, as described above, a moving object 115 can easily be aimed at when the movement of the moving object 115 is stopped, a moving object 115 can be shot at when the movement of the moving object 115 has not been stopped. Further, for example, the controller 16 calculates points corresponding to the number of times a valid action is performed in a limited time and adds the points to point information included in the game management information 18.

Figure 9:
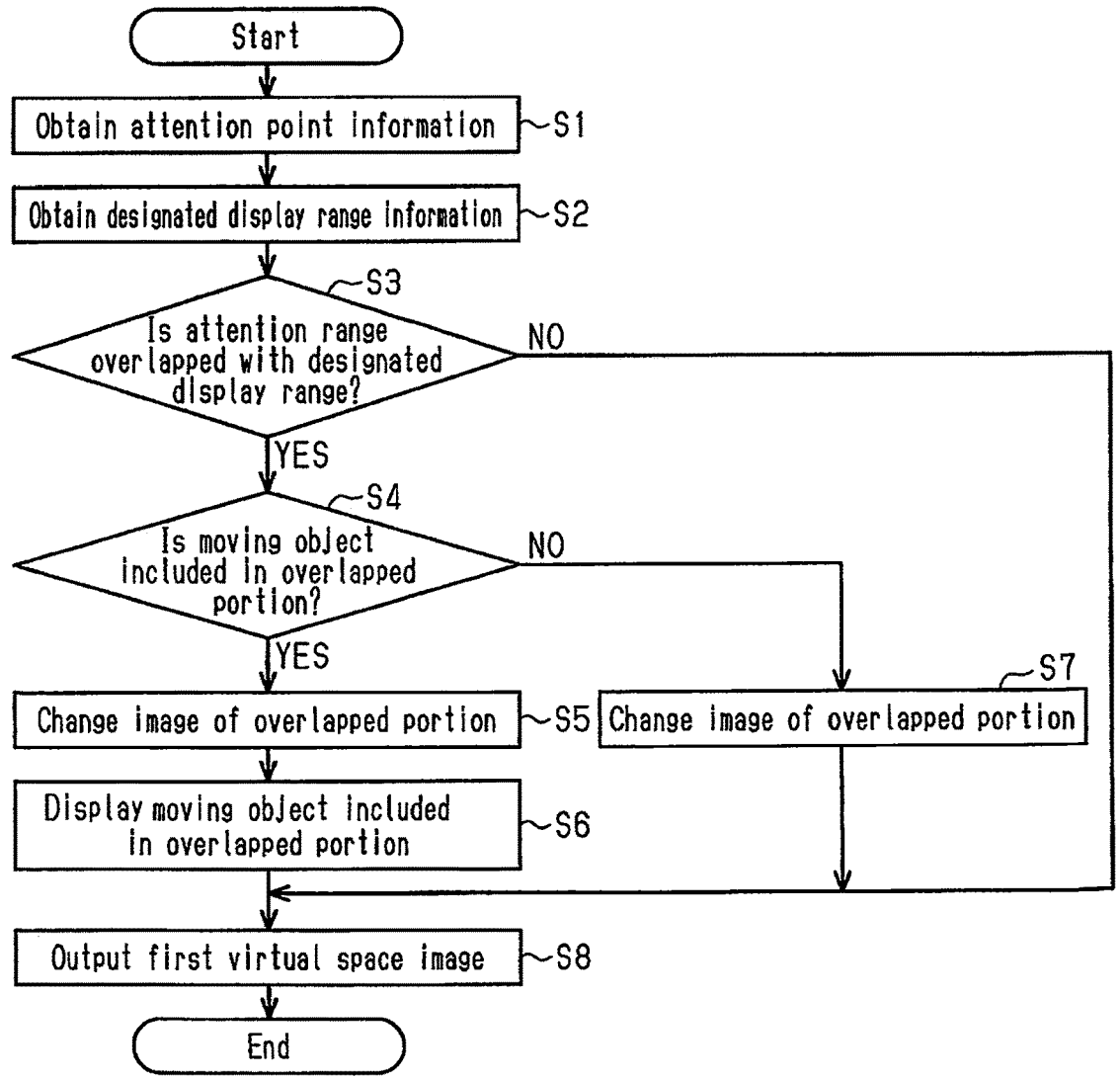
FIG. 9 is a flowchart illustrating the procedures for outputting an image to the mounted display of FIG. 1.
Figure 10:
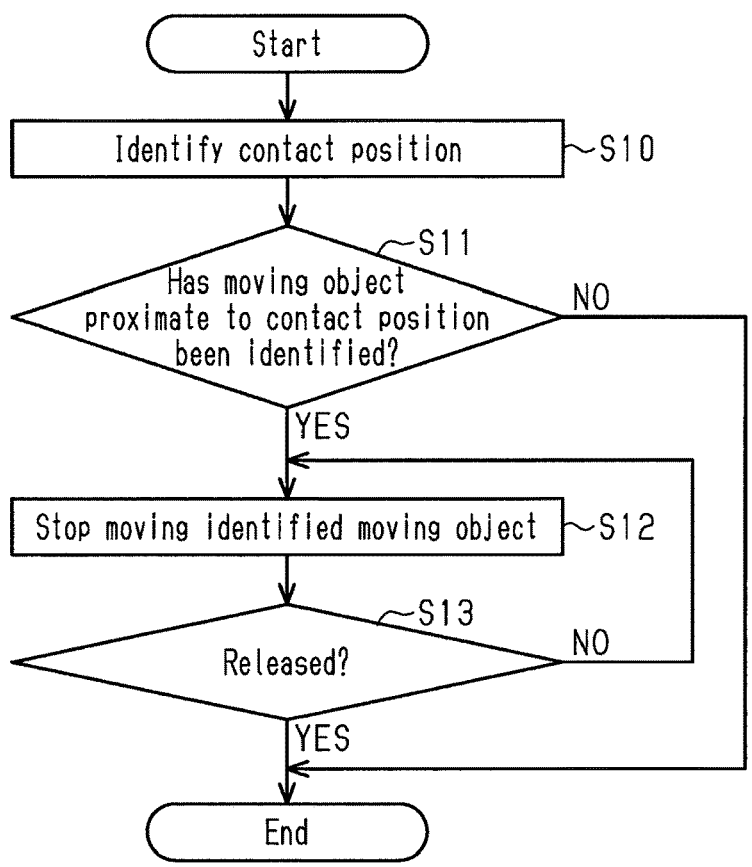
FIG. 10 is a flowchart illustrating the procedures for stopping a moving object in the application control system of FIG. 1.

The procedures of processes for providing a game to the first user 101 and the second user 102 will now be described with reference to FIGS. 9 and 10.

First, the procedures of a process for outputting the first virtual space image 120 to the HMD 11 and the main display 12 will be described with reference to FIG. 9. The process for outputting the first virtual space image 120 starts when a starting condition is satisfied, for example, when the operation unit 14 or other devices are operated to start the game. In parallel to this process, the controller 16 executes a process for obtaining the coordinates of the designated display range 112 of the touch panel display 13 and recording the coordinates in the memory 17 as the designated display range information 20.

The controller 16 obtains the attention point information 19 recorded in the memory 17 (step S1). The controller 16 identifies the attention range 111 based on the attention point information 19. Further, the controller 16 obtains the designated display range information 20 recorded in the memory 17 (step S2). The controller 16 identifies the designated display range 112 based on the designated display range information 20.

When identifying the attention range 111 and the designated display range 112, the controller 16 determines whether or not the attention range 111 is overlapped with the designated display range 112 (step S3). For example, the controller 16 determines whether or not the range of the attention range 111 in the coordinate system of the virtual space is overlapped with the range of the designated display range 112 in the coordinate system of the virtual space based on these ranges. When determining that the attention range 111 is not overlapped with the designated display range 112 (step S3: NO), the controller 16 reads image information corresponding to the attention range 111 from image information recorded in the image information memory 25 and outputs the first virtual space image in the initial state to the display 32 of the HMD 11 and the main display 12 (step S8).

In step S3, when determining that the attention range 111 is overlapped with the designated display range 112 (step S3: YES), the controller 16 determines whether or not a moving object 115 is included in the overlapped portion based on the object position information 21 (step S4). When determining that the moving object 115 is not included in the overlapped portion (step S4: NO), the controller 16 sets the overlapped portion to the varied state (step S7) and outputs the first virtual space image to the display 32 of the HMD 11 and the main display 12 (step S8). As a result, the display 32 of the HMD 11 and the main display 12 display the first virtual space image 120 in which the overlapped portion is set to the varied state and the moving object 115 is set to the non-displayed state.

In step S4, when determining that the moving object 115 is included in the overlapped portion of the attention range 111 and the designated display range 112 (step S4: YES), the controller 16 sets the overlapped portion to the varied state (step S5) and sets the moving object 115 included in the overlapped portion to the displayed state (step S6). Then, the controller 16 outputs the first virtual space image 120 to the display 32 of the HMD 11 and the main display 12 (step S8). As a result, the display 32 of the HMD 11 and the main display 12 display the first virtual space image 120 in which the overlapped portion is set to the varied state and the moving object 115 included in the overlapped portion is displayed.

In this manner, when outputting the first virtual space image 120, the controller 16 returns to step S1 and repeats steps S1 to S8 until the game ends. When the operation unit 14 is on-operated, the controller 16 causes the beam 118 to be displayed in the first virtual space image 120. Further, when the position of the moving object 115 in the displayed state corresponds to the direction of the operation unit 14, the controller 16 determines that the second action has been validly performed.

The process for stopping movement of the moving object 115 by receiving a touch operation performed by the second user 102 will now be described with reference to FIG. 10. The process for stopping movement of the moving object 115 starts when a starting condition is satisfied such as when a touch-and-hold operation is detected by the controller 16. In parallel to this process, the controller 16 executes a process for obtaining the coordinates of the designated display range 112 of the touch panel display 13 and recording the coordinates as the designated display range information 20 in the memory 17.

The controller 16 obtains the contact position information 22 recorded in the memory 17 and identifies the contact position (step S10). Further, the controller 16 determines whether or not at least one of the displayed moving objects 115 has been identified proximate to the contact position (step S11). More specifically, the controller 16 identifies the position of the displayed moving object 115 based on the object position information 21. Then, the controller 16 calculates the relative distance from the identified contact position and the position of the moving object 115 and determines whether or not the relative distance from the moving object 115 is within a predetermined distance.

When the controller 16 determines that there is no moving object 115 where the relative distance from the contact position is within the predetermined distance (step S11: NO), the controller 16 ends the process without stopping movement of any moving object 115. Further, when the controller 16 determines that there is at least one moving object 115 where the relative distance from the contact position is within the predetermined distance (step S11: YES), the controller 16 stops moving the identified moving object (step S12).

When stopping movement of the identified moving object 115, the controller 16 determines whether or not the finger of the second user 102 has been released from the screen of the touch panel display 13 (step S13). When determining that the finger of the second user 102 has not been released (step S13: NO), the controller 16 continues stopping movement of the identified moving object 115 (step S12). When determining that the finger of the second user 102 has been released (step S13: YES), the controller 16 resumes movement of the moving object 115 (step S14) and ends the process of the touch-and-hold operation. When the starting condition is satisfied, the controller 16 repeats the processes from step S1 to step S13.

As described above, the first embodiment has the following advantages.

(1) In the above embodiment, the controller 16 of the control device 15 outputs a virtual space image to both the HMD 11 and the touch panel display 13. The second user 102 designates the designated display range 112 by a touch operation without wearing the HMD 11, and the controller 16 identifies the range corresponding to the touch operation in the virtual space as the first action. That is, the second user 102 assists the first user 101 by the first action. Further, the first user 101 uses the operation unit 14 to perform operation on a moving object 115 displayed in the overlapped portion of the attention range 111 and the designated display range 112, and the controller 16 performs the second action on the moving object 115 in correspondence with the operation. Thus, the second user 102 has to perform the first action for the first user 101 to perform the second action. This allows the first user 101 and the second user 102 to cooperate in the virtual space in order for the game to progress.

(2) In the above embodiment, the controller 16 identifies the designated display range 112 designated by the second user 102. Then, the controller 16 reflects the designated display range 112 on the first virtual space image 120. Thus, the second user 102 can point out a certain range in the virtual space to the first user 101 without wearing the HMD 11.

(3) In the above embodiment, when the designated display range 112 is not overlapped with the attention range 111, the controller 16 outputs a moving object 115 in a non-displayed state to the HMD 11. When the designated display range 112 is overlapped with the attention range 111, the controller 16 outputs the moving object 115 included in the overlapped portion to the HMD 11 in a displayed state. That is, the second user 102 designates a certain range including the moving object 115, and the first user 101 includes the designated range in the attention range 111. This allows the first user to visually recognize the moving object 115. Accordingly, the first user 101 and the second user 102 can cooperate in order for the game to progress.

(4) In the above embodiment, the controller 16 outputs the first virtual space image to the HMD 11 where at least one of brightness, saturation, and hue of the designated display range 112 differs from that of the other range of the designated display range 112. This allows the first user 101 who is wearing the HMD 11 to distinguish the range designated with the touch panel display 13 from the other range. Further, the controller 16 causes the range designated by the second user 102 with the touch panel display 13 to be displayed as if irradiated with light. This limits decreases in the sense of immersion of the first user 101 as compared to when, for example, the range is indicated to the first user 101 by a line enclosing the range.

(5) In the above embodiment, the controller 16 validates the second action only for the moving object 115 that is included in the overlapped portion of the attention range 111 and the designated display range 112. Thus, in order to validly perform the second action, the moving object 115 has to be included in the designated display range 112 designated by the second user 102. Accordingly, the first user 101 and the second user 102 can cooperate in order for the game to progress.

(6) In the above embodiment, the controller 16 sets the horizontal viewing angle β of the second virtual space image 121 to be smaller than the horizontal viewing angle α of the first virtual space image 120. Thus, the first user 101 needs to perform operations for the second action within a narrow range in the virtual space. This increases the difficulty of the second action and requires assistance of the second user 102. Accordingly, the first user 101 and the second user 102 can cooperate in order for the game to progress.

(7) In the above embodiment, the controller 16 causes the touch panel display 13 to constantly display a moving object 115. Thus, in order for the first user 101 to find the moving object 115, the second user 102 has to provide the position information of the moving object 115 by designating the designated display range 112. That is, the first user 101 is supposed to search for the moving object 115 based on the position information of the moving object 115 provided from the second user 102. Accordingly, the first user 101 and the second user 102 can cooperate in order for the game to progress.

(8) In the above embodiment, the controller 16 moves a moving object 115 in the first virtual space image 120 output to the HMD 11. Further, as the first action, the controller 16 stops moving the moving object 115 in the first virtual space image 120 and the second virtual space image 121 output to the touch panel display 13 based on a touch operation performed on the touch panel display 13. This allows the first user 101 to easily shoot, which is the second action, the moving object 115 of which movement has been stopped. Accordingly, the first user 101 and the second user 102 can cooperate in order for the game to progress.

(9) In the above embodiment, the controller 16 identifies a moving object 115 displayed proximate to a contact point on the screen of the touch panel display 13 and stops moving only the identified moving object 115. That is, movement of a single moving object 115 can be stopped with a single contact point. The second user 102 only needs to touch the vicinity of a portion on the screen that displays a moving object 115, the movement of which the second user 102 wants to stop. This facilitates intuitive understanding by the second user 102 of the operation for stopping the movement. Further, when stopping movement of multiple moving objects 115, it requires contact points, the number of which is equal to that of the moving objects 115. This can increase the difficulty for stopping moving objects in correspondence with the number of the moving objects 115, the movement of which the second user 102 wants to stop.

(10) In the above embodiment, the controller 16 sets the moving object 115 to a displayed state and outputs the bird's-eye view image 122, which is a bird's-eye view of the virtual space, to the touch panel display 13. This allows the second user 102 to understand the position or state of the moving object 115 included in the virtual space. Thus, the moving object 115 that is aimed to shoot, which is the second action, is easily included in the designated display range 112. Further, the second user 102 easily understands the positional relationship of the designated display range 112 and the moving object 115.

Second Embodiment

A second embodiment of the present invention will now be described. In the second embodiment, the first action of the first embodiment is modified. Like or same reference numerals are given to those components that are the same as the corresponding components of the first embodiment. Such components will not be described in detail.

In the first embodiment, the first action is to identify the designated display range 112. In the present embodiment, the first action is to select a moving object 115 based on operation performed by the second user 102. In the present embodiment, in the initial state of the first virtual space image 120 output to the HMD 11, at least moving objects 115 only need to be in a non-displayed state. That is, the first virtual space image 120 of the present embodiment does not have to be in a displayed state having a low brightness such as a state of "darkness."

Figure 11:
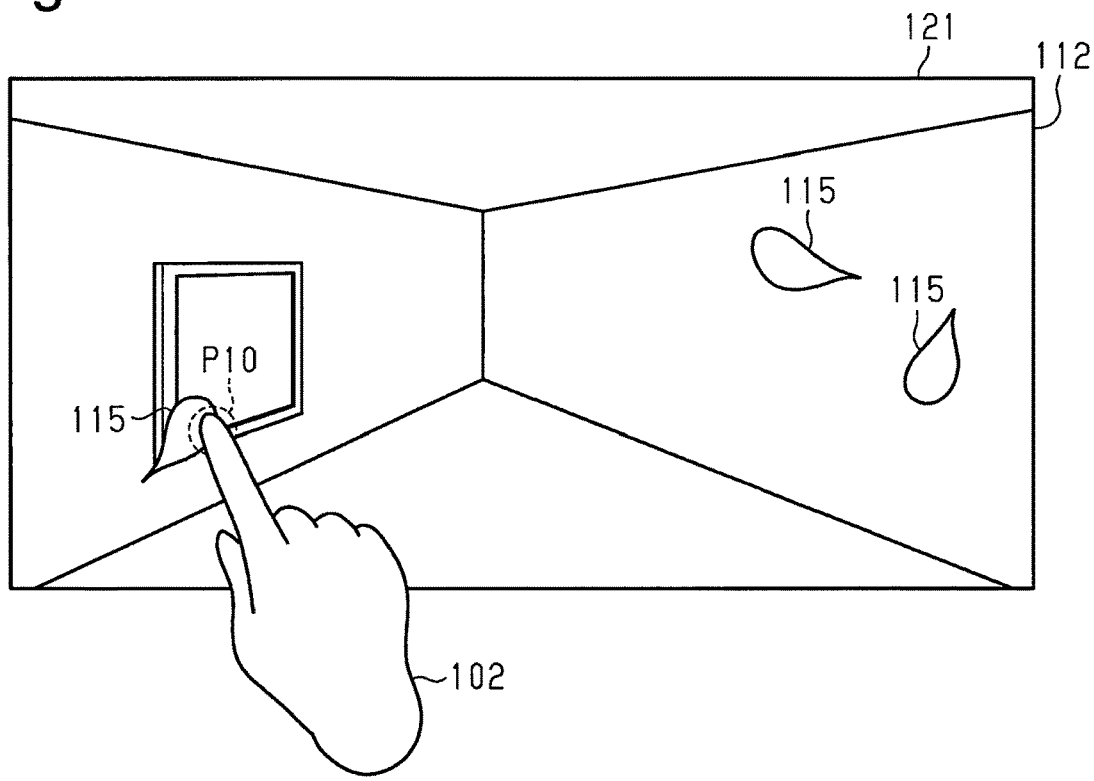
FIG. 11 is a diagram illustrating the second virtual space image output to a touch panel display in a second embodiment.

As shown in FIG. 11, the second virtual space image 121 displayed on the touch panel display 13 displays the moving objects 115. The second user 102 designates a moving object 115 by a touch operation. FIG. 11 displays an example in which there is one contact position P10. However, there may be multiple contact positions.

The controller 16 obtains the coordinates of the contact position P10 from the touch panel display 13. Then, based on the object position information 21, the controller 16 determines whether or not there is a moving object 115 displayed in a portion where the relative distance from the coordinates of the contact position P10 is less than or equal to a predetermined distance.

When the controller 16 determines that there is a moving object 115 displayed in the portion where the relative distance from the contact position P10 is less than or equal to the predetermined distance, the controller 16 sets the moving object 115 to a displayed state on the first virtual space image 120 and outputs the moving object 115 to the display 32 of the HMD 11 and the main display 12. Although the first embodiment executes a process for stopping movement of a moving object 115 displayed proximate to the contact position P10, the second embodiment does not execute the process.

As long as the relative distance from the contact position P10 and the moving object 115 remains less than or equal to the predetermined distance, the controller 16 continues to display the moving object 115 on the first virtual space image. When the relative distance from the contact position P10 and the moving object 115 exceeds the predetermined distance as the moving object 115 moves even if the second user 102 is continuing the touch operation, the controller 16 sets the moving object 115 to the non-displayed state.

In this manner, in the present embodiment, a moving object 115 selected by the second user 102 is displayed in the first virtual space image 120. Thus, the task for designating a moving object 115 becomes further complex. As a result, the first user 101 and the second user 102 need to cooperate closely. This increases the degree of amusement with a preferred difficulty of the game.

As described above, the second embodiment has the following advantage in addition to advantage (1) of the first embodiment.

(11) In the above embodiment, the controller 16 of the control device 15 identifies a moving object 115 selected by the second user 102. Then, the controller 16 causes the moving object 115 selected by the second user 102 to be displayed in the first virtual space image 120. Thus, the second user 102 can point out the selected moving object 115 to the first user 101 without wearing the HMD 11.

Third Embodiment

A third embodiment of the present invention will now be described. In the third embodiment, the designated display range of the first embodiment is variable. Like or same reference numerals are given to those components that are the same as the corresponding components of the first embodiment. Such components will not be described in detail.

In the first embodiment, the designated display range 112 is the entire range displayed in the touch panel display 13 by a touch operation of the second user 102. In the present embodiment, the size or position of the designated display range 112 can be varied by a touch operation performed by the second user 102.

Figure 12:
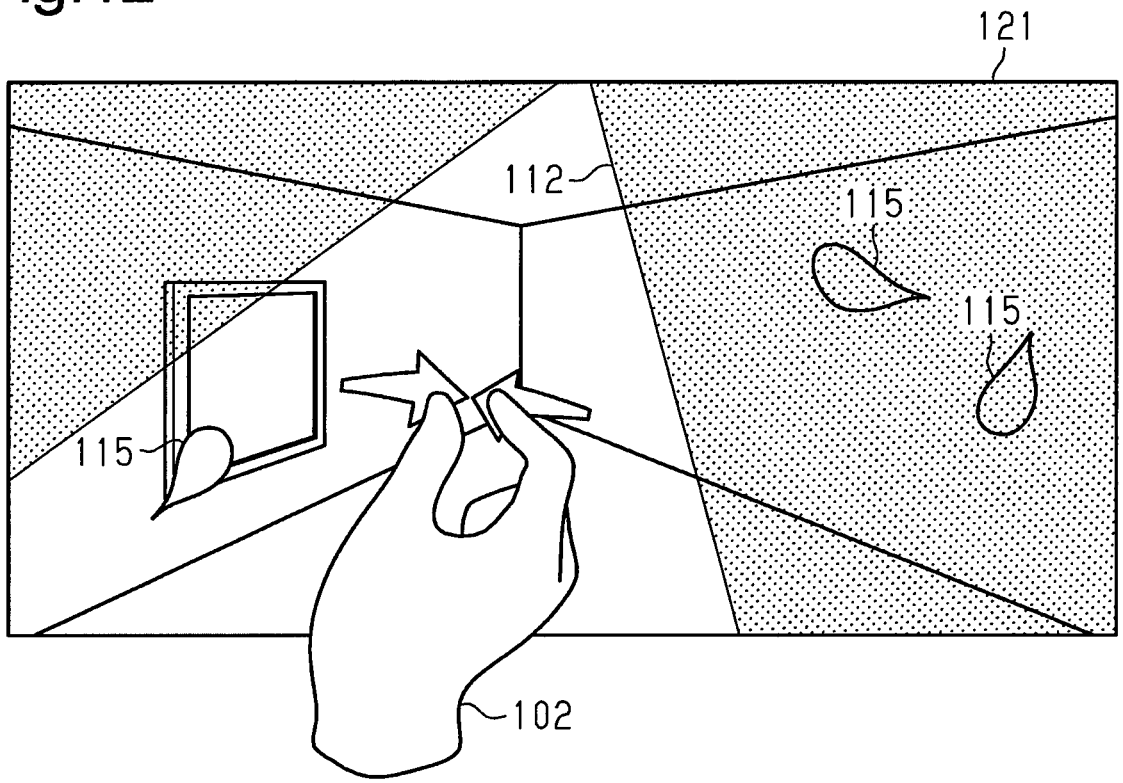
FIG. 12 is a diagram illustrating the second virtual space image output to a touch panel display in a third embodiment.

As shown in FIG. 12, the second user 102 varies the size or position of the designated display range 112 by, for example, a pinch-in operation where the second user 102 moves two fingers toward each other on the screen or a pinch-out operation where the second user 102 moves two fingers away from each other on the screen. The designated display range 112 is the entire screen in the initial state. When the pinch-in operation is performed, the controller 16 contracts the designated display range 112 based on the path of the pinch-in operation. When the pinch-out operation is performed, the controller 16 enlarges the contracted designated display range 112 based on the path of the pinch-out operation. Further, when the two fingers move in contact with the screen after the pinch-in operation or the pinch-out operation, the controller 16 moves the designated display range 112 in the view based on the input path of the operation while maintaining the size of the designated display range 112. The position of the light source (origin) may be moved in accordance with the movement of the designated display range 112.

In addition, contraction of the designated display range 112 may produce a special effect on the moving objects 115. For example, moving objects 115 included in the designated display range 112 at the point of time when contraction of the designated display range 112 starts may be restricted from moving out of the designated display range 112. As a result, contraction of the designated display range 112 can gather the moving objects 115, which are included in the designated display range 112, in the contracted designated display range 112. When the moving objects 115 are gathered in such a narrow range, the first user 101 can easily shoot a large number of moving objects 115 at the same time.

When the pinch-in operation is performed, based on the input path of the touch operation, the controller 16 contracts the designated display range 112 in correspondence with the length or angle of the input path. Further, the controller 16 outputs, to the touch panel display 13, the second virtual space image 121 in a varied state in which the brightness, saturation, and hue of the contracted designated display range 112 differ from those of the other range. The second virtual space image 121 includes a portion in the initial state, for example, in "darkness," displayed with a low brightness and saturation. The controller 16 may set moving objects 115 included in the portion of the initial state to a displayed state or a non-displayed state.

In addition, the controller 16 determines whether or not there is a portion where the attention range ill and the designated display range 112 of the first user 101 are overlapped. When the overlapped portion exists, the controller 16 outputs, to the display 32 of the HMD 11 and the main display 12, the first virtual space image 120 in which the overlapped portion is set to the varied state and the other portion is set to the initial state.

When the first user 101 validly performs shooting or the like, the moving objects 115 included in the designated display range 112 are eliminated or reduced in number. Then, the second user 102 performs the pinch-out operation for enlarging the designated display range 112 on the screen of the touch panel display 13. When the pinch-out operation is performed, the controller 16 enlarges the designated display range 112 in correspondence with the length or angle of the input path of an input touch operation. Further, the controller 16 outputs, to the touch panel display 13, the second virtual space image 121 in which the enlarged designated display range 112 is set to the varied state and the other portion is set to the initial state. Thus, the designated display range 112 will include new moving objects 115.

As described above, the third embodiment has the following advantage in addition to advantages (1) to (10) of the first embodiment.

(12) In the above embodiment, the controller 16 varies the size or position of the designated display range 112 based on the touch operation performed on the screen of the touch panel display 13. This allows for, for example, only part of the view to be pointed out.

Fourth Embodiment

A fourth embodiment of the present invention will now be described. In the fourth embodiment, a moving object is set to a non-displayed state with the touch panel display and displayed in the second virtual space image in correspondence with operation performed on the operation unit. Like or same reference numerals are given to those components that are the same as the corresponding components of the first embodiment. Such components will not be described in detail.

In the first embodiment, the first action is to identify the designated display range 112 based on operation performed by the second user 102, and the second action is to shoot a moving object 115 based on operation performed by the first user. In the present embodiment, the first action is to select a moving object 115 by the first user 101, and the second action is to attack a moving object 115 based on a touch operation performed by the second user 102 on the touch panel display 13.

Figure 13:
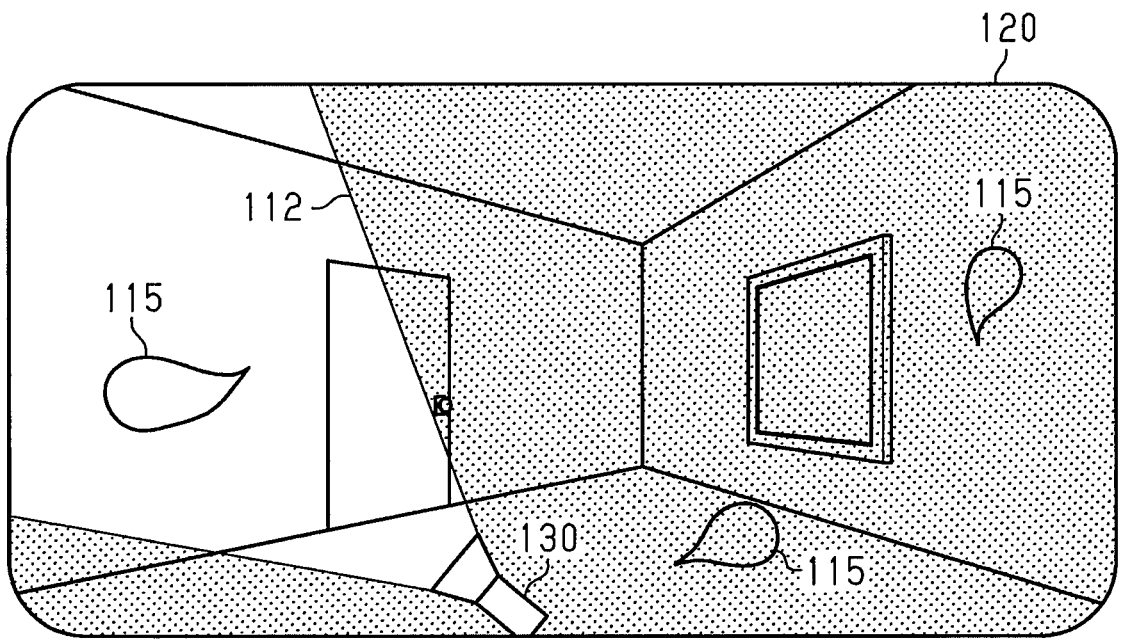
FIG. 13 is a diagram illustrating the first virtual space image output to a mounted display in a fourth embodiment.

As shown in FIG. 13, the controller 16 outputs, to the display 32 of the HMD 11 and the main display 12, the first virtual space image 120 in which moving objects 115 are constantly in displayed states. The operation unit 14 operated by the first user 101 is a controller or a glove controller that can vary directions and be on- and off-operated. The first user 101 operates the operation unit 14 to select a moving object 115 in the virtual space. More specifically, the controller 16 varies the orientation of a light source 130 such as a flashlight displayed in the first virtual space image 120 depending on the operation performed on the operation unit 14. This allows a moving object 115 to be irradiated with light and to be selected. Alternatively, a moving object 115 is captured using a tool such as a net or case in the virtual space.

A signal output from the operation unit 14 is input to the controller 16, and the controller 16 determines whether or not a moving object 115 has been selected based on the object position information 21. When determining that the moving object 115 has been selected, the controller 16 outputs, to the touch panel display 13, the second virtual space image 121 in which the selected moving object 115 is set to a displayed state.

In the initial state, a moving object 115 is set to a non-displayed state in the second virtual space image 121 output to the touch panel display 13. When the moving object 115 selected by the first user 101 is set to the displayed state on the second virtual space image 121, the second user performs a touch operation on the moving object 115, which is in the displayed state, to attack the moving object 115. When the controller 16 determines that the moving object 115 has been attacked based on a signal input from the touch panel display 13, the controller 16 reflects the attack to the moving object 115 on the first virtual space image 120 and outputs the first virtual space image 120 to the HMD 11 and the main display 12.

As described above, the fourth embodiment has the following advantage.

(13) In the above embodiment, the first user 101 selects a moving object 115 and sets the selected moving object 115 to a displayed state on the second virtual space image 121. The second user 102 can attack the moving object 115, which is in the displayed state in the virtual space, without wearing the HMD 11. This allows the first user 101 and the second user 102 to cooperate in order for the game to progress.

OTHER EMBODIMENTS

Each of the above embodiments may be modified as described below.

In each of the above embodiments, the controller 16 sets the position of the character 116, which corresponds to the second user 102 in the virtual space, to a position located upward in the vertical direction from the first user 101. Instead, the position of the character 116 may be changed based on, for example, a touch operation performed by the second user 102 on the screen of the touch panel display 13.

In each of the above embodiments, the horizontal viewing angle β of the second virtual space image is smaller than the horizontal viewing angle α of the first virtual space image. Instead, the horizontal viewing angle β of the second virtual space image may be equal to or larger than the horizontal viewing angle α of the first virtual space image 120. This facilitates finding in the designated display range 112. Thus, this is effective for, for example, reducing the difficulty in finding an object. In the same manner, the vertical viewing angle of the second virtual space image may be smaller than the vertical viewing angle of the second virtual space image or greater than or equal to the vertical viewing angle of the second virtual space image.

In each of the above embodiments, the controller 16 causes the main display 12 to display the attention range of the first user 101 as the first virtual space image. Alternatively or additionally, the controller 16 may cause the attention range 111 of the first user 101 to be displayed on, for example, the second virtual space image 121. The attention range 111 may be indicated by enclosing the range with a line. The attention range 111 may be displayed so that at least one of the brightness, saturation, and hue of the attention range 111 differs from that of the background of the second virtual space image 121. In this case, the main display 12, which the second user 102 visually recognizes, may be omitted.

In each of the above embodiments, the controller 16 outputs the bird's-eye view image 122 that is a bird's eye view of the virtual space to the touch panel display 13. However, when, for example, the object positions in the virtual space are easy to understand, the bird's-eye view image 122 does not have to be displayed.

In each of the above embodiments, the controller 16 causes at least one of the brightness, saturation, and hue of the designated display range 112 to be displayed differently from the portion other than the designated display range 112. In addition, as the first action, the designated display range 112 may be enclosed by a line displayed in the image or be marked with an arrow or the like.

In each of the above embodiments, the controller 16 causes the designated display range 112 to be displayed on the first virtual space image and the second virtual space image where at least one of the brightness, saturation, and hue of the designated display range 112 differs from that of the portion other than the designated display range 112. In addition, as time elapses, the controller 16 may cause the designated display range 112 to be displayed changing at least one of the brightness, saturation, and hue as time elapses. More specifically, when the designated display range 112 is displayed in brightness, saturation, and hue as if irradiated with light, the controller 16 may, as time elapses, vary at least one of the brightness, saturation, and hue so as to darken the designated display range 112 or irradiate the designated display range 112 with light of a color differing from the light in the initial state.

In each of the above embodiments, the controller 16 stops moving a moving object 115 as the first action based on the contact position of the second user 102 on the touch panel display 13. Alternatively or additionally, the controller 16 may stop moving a moving object 115 based on a selection operation performed on an item displayed in the view on the touch panel display 13. For example, when a special item displayed in the view of the touch panel display 13 is selected, the controller 16 may stop moving all of the moving objects 115 displayed in the view of the touch panel display 13. Further, when the item is dragged and dropped to the vicinity of a portion in the screen that displays a moving object 115, the controller 16 may stop moving the moving object 115.

In each of the above embodiments, the controller 16 stops moving a moving object 115 as the first action based on the contact position of the second user 102 on the touch panel display 13. Alternatively or additionally, the controller 16 may stop moving a moving object included in a predetermined range corresponding to a single contact position. The predetermined range corresponding to the single contact position is, for example, a circular range centered about the contact position or a rectangular or sectoral range where the contact position is set to a starting point (for example, corner). As another option, the predetermined range may be selected by swiping, tapping with two fingers, or the like.

In each of the above embodiments, the second action is performed on a moving object 115 that is constantly moving. Alternatively or additionally, the second action may be performed on an object arranged at a predetermined fixed position in the virtual space. Such an object is, for example, a box, a door, a musical instrument, or the like arranged in the virtual space. In this case, the second action is, for example, to open a box lid, open a door, play the musical instrument, or the like.

In each of the above embodiments, the second action cannot be performed or is invalidated when performed on a moving object 115 that is not included in the overlapped portion of the attention range 111 and the designated display range 112. Instead, the second action may be performed on an object that is not included in the overlapped portion. In this case, for example, an object included in the overlapped portion may be clearly displayed so that the object can easily be aimed at, and an object that is not included in the overlapped portion may be unclearly displayed. Further, when a valid action is performed on an object that is not included in the overlapped portion, higher points may be obtained as compared to when a valid action is performed on an object included in the overlapped portion.

In each of the above embodiments, a predetermined object (moving object 115) is in a non-displayed state in the first virtual space image output to the display 32 of the HMD 11 and the main display 12. Instead, an object that is subject to the second action may be in a displayed state in the first virtual space image. In this case, for example, the display mode of the overlapped portion of the attention range ill and the designated display range 112 may differ from that of the other portion so that the second action is valid only for a moving object 115 included in the overlapped portion. Even in this case, the second action is validated only for the predetermined object included in the overlapped portion. This allows the first user 101 and the second user 102 to cooperate in order for the game to progress.

Instead, the display mode of an object or a virtual space image of the object may be different between the first virtual space image and the second virtual space image. For example, the second virtual space image can be enlarged or contracted, and the second virtual space image can display an object at any angle. However, the first virtual space image cannot be enlarged or contracted or can display an object only at a certain angle. Alternatively, the second virtual space image may be a bird's-eye view image that is a bird's-eye view of the virtual space including an object, and the first virtual space image may display no bird's-eye view image. As another option, a predetermined image processing such as transmission or edge extraction performed on the second virtual space image may be enabled, and a predetermined image processing performed on the first virtual space image may be disabled.

Figure 14:
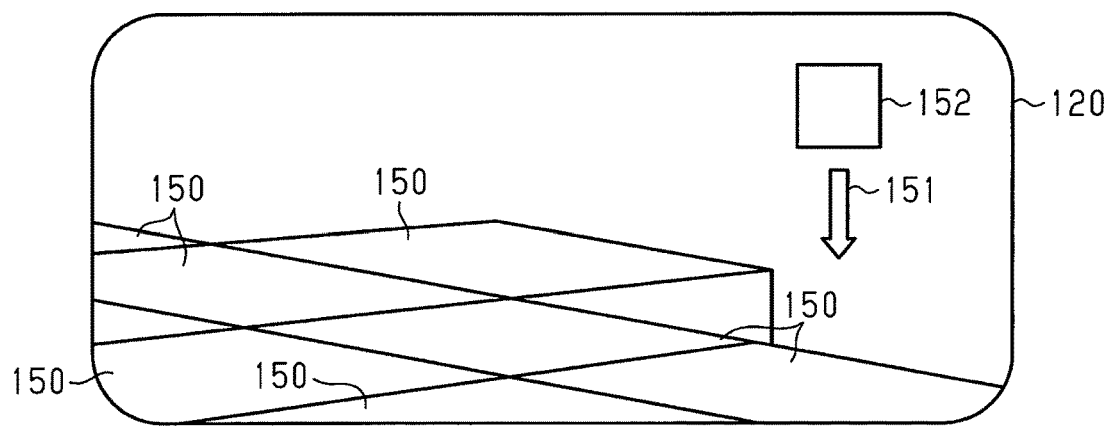
FIG. 14 is a diagram illustrating the first virtual space image output to a touch panel display in a modified example.
Figure 15:
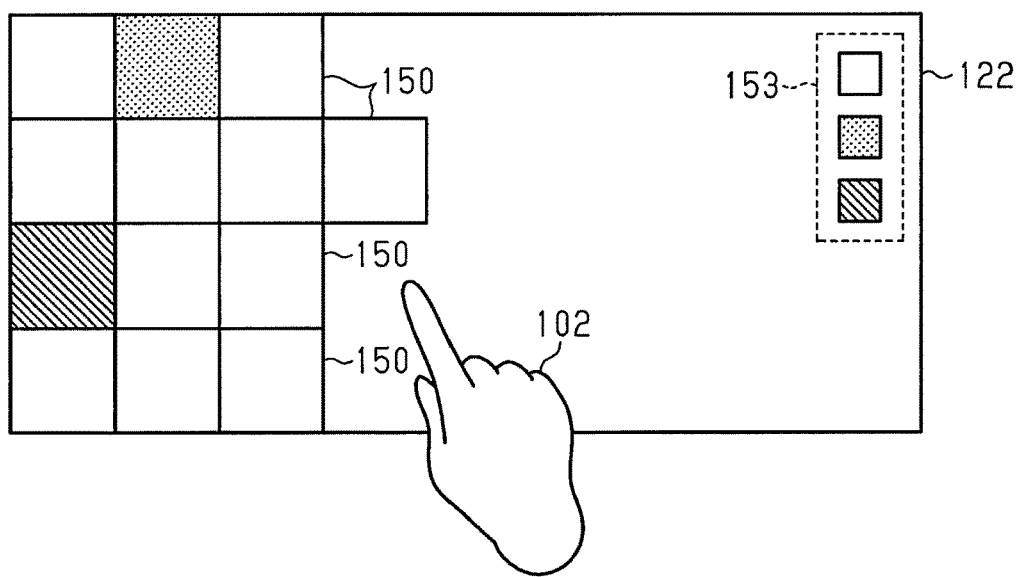
FIG. 15 is a diagram illustrating the second virtual space image output to the touch panel display in the modified example.

FIGS. 14 and 15 show an example in which the second virtual space image is a bird's-eye view image that is a bird's-eye view of the virtual space including an object and the first virtual space image is not a bird's-eye view image. For example, the game played by the first user 101 and the second user 102 is a puzzle game in which three-dimensional figures are combined. As shown in FIG. 14, the controller 16 outputs, to the HMD 11 or the like, the first virtual space image 120 that is an image of a virtual space including a three-dimensional figure 150, which is an object, in correspondence with the posture of the first user 101. The three-dimensional figure 150 may be, for example, a triangular prism, a circular cone, or a sphere in addition to a cube and a cuboid and is not particularly limited. The first user 101 operates the operation unit 14 to combine the three-dimensional figures. When a predetermined number or more of three-dimensional figures 150 are combined, it is difficult to include, in a viewing angle of the first virtual space image 120, the entire pattern formed by a combination of the three-dimensional figures 150. Thus, when the first user 101 forms a targeted pattern, it is difficult to determine positions where the three-dimensional figures 150 should be located and/or the types of the three-dimensional figures 150 that should be arranged.

As shown in FIG. 15, the controller 16 outputs, to the touch panel display 13, the bird's-eye view image 122 that is a bird's-eye view of the pattern formed by a combination of three-dimensional figures 150. The second user 102 can visually recognize the entire pattern through the bird's-eye view image 122 and thus easily determine on which positions the three-dimensional figures 150 should be arranged.

Further, when, for example, the second user 102 touches a predetermined position on the screen of the touch panel display 13 as shown in FIG. 15, the controller 16 uses an instruction position mark 151 to display the position where a three-dimensional figure 150 should be arranged in the first virtual space image 120 (first action) as shown in FIG. 14. Alternatively, instead of the instruction position mark 151, the position where a three-dimensional figure 150 should be arranged may be displayed in a display mode that differs from a display mode of the other portion. The controller 16 arranges a three-dimensional figure 150 at a position that is based on operation performed by the first user 101 on the operation unit 14 (second action).

Further, in a puzzle game in which an action is performed based on the layout of the types of the three-dimensional figures 150, for example, the second user 102 selects a three-dimensional figure 150 from a display region 153 for selecting the types of the three-dimensional figures 150 and touches the position where the three-dimensional figure 150 should be arranged (refer to FIG. 15). As shown in FIG. 14, the controller 16 uses a type identification mark 152 to display the type of a three-dimensional figure 150 that should be arranged (first action). Additionally, the position where the three-dimensional figure 150 should be arranged may be displayed using the instruction position mark 151 or the like. The first user 101 operates the operation unit 14 to arrange the three-dimensional figure 150 indicated by the type identification mark 152 at the position indicated by the instruction position mark 151.

In each of the above embodiments, as the first action, the range of the inside of the virtual space is designated as the designated display range 112 based on a touch operation performed on the touch panel display 13. Instead, as the first action, the direction or the position inside the virtual space may be indicated based on the touch operation performed on the touch panel display 13.

Figure 16A:
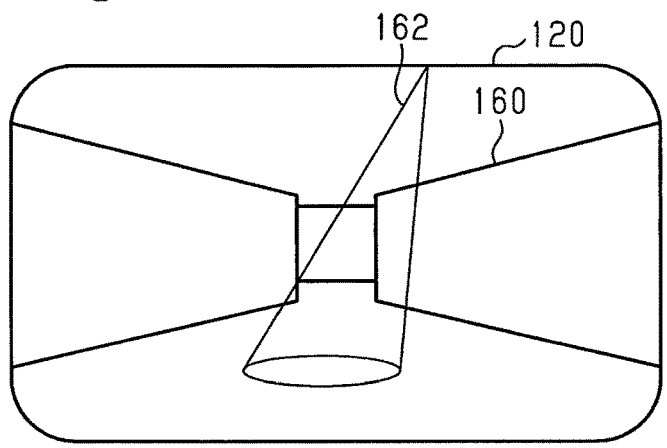
FIG. 16A is a diagram illustrating a virtual space image output to a mounted display.
Figure 16B:
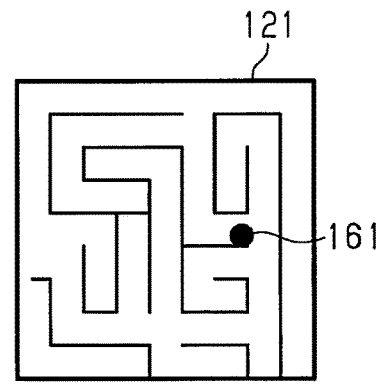
FIG. 16B is a diagram illustrating a virtual space image output to the touch panel display.

FIGS. 16A and 16B show an example view output in a maze game. As shown in FIG. 16A, the controller 16 causes the display 32 of the HMD 11 or the like to display an image of a three-dimensional maze 160 arranged in the virtual space as the first virtual space image 120. The controller 16 outputs the first virtual space image 120 in correspondence with the posture of the user and varies the first virtual space image 120 so as to advance through the three-dimensional maze 160 based on operation performed on the operation unit 14 or a user position detected by a sensor. As shown in FIG. 16B, the controller 16 causes the touch panel display 13 to display a bird's-eye view image of the three-dimensional maze 160 as the second virtual space image 121. The controller 16 causes a position 161 of the first user 101 to be displayed in the second virtual space image 121. As the first user 101 advances, the second user 102, for example, moves a finger in the direction in which the first user 101 should further advance while visually recognizing the second virtual space image 121. The controller 16 obtains the input path corresponding to the touch operation from the touch panel display 13 and displays the instructed direction along the input path (first action) in the first virtual space image 120. For example, the direction instructed by the second user 102 may be displayed in the first virtual space image 120 as light having brightness, saturation, and hue that differs from those of the background or may be displayed on the first virtual space image 120 as an indicator such as an arrow. The first user 101 advances through the three-dimensional maze 160 by operating the operation unit 14 or the like with reference to the direction instructed on the first virtual space image 120.

Each of the above embodiments may include a position detection sensor that detects the position of the first user 101 in real space in addition to the HMD 11, which detects the position and orientation of the head of the first user 101. Using the position detection sensor, the controller 16 detects the position where the first user 101 is standing as well as the position and orientation of the head of the first user 101 and renders image information of the virtual space in correspondence with the position where the first user 101 is standing to display the first virtual space image. As a result, the first virtual space image varies as the first user 101 moves. This further increases the sense of immersion.

Figure 17:
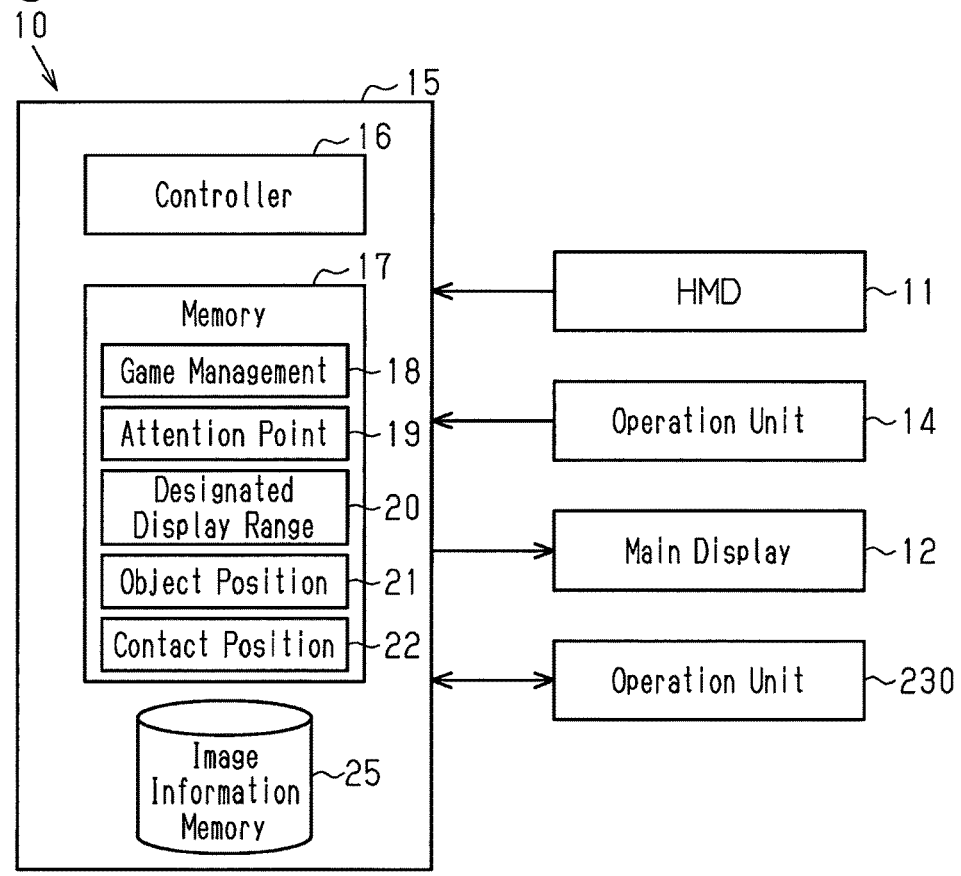
FIG. 17 is a functional block diagram showing a modified example of an application control system.

In each of the above embodiments, the touch panel display 13 is used as the operation unit for which the second user 102 can provide inputs. Instead, an operation unit 230 including no display may be used. As shown in FIG. 17, the application control system includes an operation unit 230 (first operation unit) including a switch and the like. The second user 102 operates the operation unit 230 while visually recognizing an image displayed on the main display 12, and the controller 16 performs the first action in the virtual space in correspondence with an input operation performed by the second user 102 on the operation unit 230.

Figure 18:
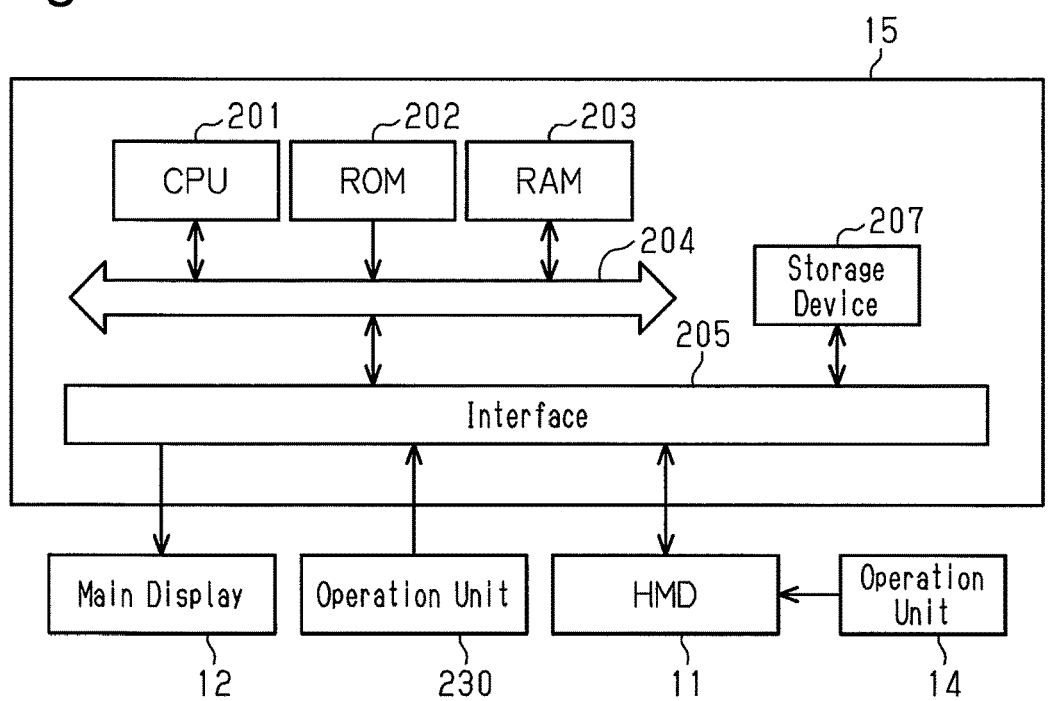
FIG. 18 is a diagram showing one example of the configuration of the application control system shown in FIG. 17.

FIG. 18 shows one example of the configuration of the control device 15. The control device 15 includes a CPU 201, a ROM 202, and a RAM 203 as controllers. The CPU 201, the ROM 202, and the RAM 203 are connected to one another by various buses 204. Further, the control device 15 includes a storage device 207 as the memory 17 and the image information memory 25. The CPU 201 outputs image information to the main display 12 and the HMD 11 via an interface 205. Referring to FIG. 18, the CPU 201 may obtain an operation signal from the operation unit 14 (second operation unit), which is operated by the first user 101, via the HMD 11 or may obtain an operation signal from the operation unit 14 without using the HMD 11. In addition, the CPU 201 obtains an operation signal from the operation unit 230, which is operated by the second user 102, via the interface 205. The control device 15 and the operation unit 230 may be connected by a communication cable or may be connected via wireless communication. This aspect eliminates the need for the second user 102 to compare an image displayed on the main display 12 with an image displayed on the touch panel display 13.

In each of the above embodiments, the game in which a virtual space image is output to the HMD 11 and the touch panel display 13 is embodied in a game of shooting a predetermined object. Instead, the game in which a virtual space image is output to the HMD 11 and the touch panel display 13 may be applied to other games such as an exploration game, a card game, a racing game, a fighting game, a simulation game, and a roll-playing game. Further, the action performed on an object is not limited to "shooting" and may be other actions such as deforming, throwing, hitting, splitting, scattering, rotating, and moving.

In each of the above embodiments, the application in which a virtual space image is output to the HMD 11 and the touch panel display 13 is embodied in a game. Instead, the application may be an application other than a game, for example, an application that performs simulations used for fields other than game fields such as medical fields and educational fields and an application in which training is performed.

The invention claimed is:

1. A non-transitory computer-readable medium storing computer executable instructions which, when executed by circuitry of a system, causes the circuitry to:
    output a first image of a virtual space to a first display, the first image corresponding to a posture of a first user wearing the first display;
    output a second image of the virtual space to a second display of a second user;
    detect an input operation, relative to the second display, by the second user, wherein the input operation by the second user results in a change in movement of only a first object displayed in the virtual space;
    reflect the change in the movement of the first object in the first image of the virtual space on the first display; and
    detect an input operation, relative to the first display which displays the first image reflecting the change in the movement of the first object, by the first user, wherein the first image has a first display range corresponding to an attention range of the first user, the second image has a second display range, and the first object, having the changed movement, is caused to be visibly displayed in the first image only after the input operation by the second user and only when the first object is positioned in an overlapping portion of the first and second display ranges.

2. The non-transitory computer-readable medium according to claim 1, wherein
the input operation by the second user that results in the change in the movement of the first object includes selection of an item displayed on the second display.

3. The non-transitory computer-readable medium according to claim 1, wherein
when a second object is positioned in the virtual space outside of the overlapping portion, the first and second objects are displayed differently.

4. The non-transitory computer-readable medium according to claim 1, wherein
the change in the movement of the first object resulting from the input operation by the second user includes stopping the movement of the first object.

5. The non-transitory computer-readable medium according to claim 1, wherein
the input operation by the second user results in the change in the movement of the first object only when the first object is positioned within a predetermined range from a contact position of the input operation relative to the second display.

6. The non-transitory computer-readable medium according to claim 1, wherein the computer executable instructions further cause the circuitry to
output a bird's-eye view image of the virtual space to the second display.

7. The non-transitory computer-readable medium according to claim 3, wherein the computer executable instructions further cause the circuitry to
output the second image such that the attention range of the first user is displayed in the second image of the virtual space on the second display of the second user.

8. The non-transitory computer-readable medium according to claim 1, wherein the computer executable instructions further cause the circuitry to
detect a position of the first user in real space; and
output the first and second images of the virtual space according to the detected position of the first user.

9. The non-transitory computer-readable medium according to claim 1, wherein
the input operation by the second user that results in the change in the movement of the first object includes selection of an item displayed on the second display,
the item is different from the first object, and
the input operation by the second user results in the change in the movement of only the first object.

10. A method comprising:
outputting, by circuitry of a system, a first image of a virtual space to a first display, the first image corresponding to a posture of a first user wearing the first display;
outputting, by the circuitry, a second image of the virtual space to a second display of a second user;
detecting, by the circuitry, an input operation, relative to the second display, by the second user, wherein the input operation by the second user results in a change in movement of only a first object displayed in the virtual space;
reflecting, by the circuitry, the change in the movement of the first object in the first image of the virtual space on the first display; and
detecting, by the circuitry, an input operation, relative to the first display which displays the first image reflecting the change in the movement of the first object, by the first user, wherein
the first image has a first display range corresponding to an attention range of the first user, the second image has a second display range, and
the first object, having the changed movement, is caused to be visibly displayed in the first image only after the input operation by the second user and only when the first object is positioned in an overlapping portion of the first and second display ranges.

11. The method according to claim 10, wherein
the input operation by the second user that results in the change in the movement of the first object includes selection of an item displayed on the second display,
the item is different from the first object, and
the input operation by the second user results in the change in the movement of only the first object.

12. An application control system comprising:
circuitry configured to:
output a first image of a virtual space to a first display, the first image corresponding to a posture of a first user wearing the first display;
output a second image of the virtual space to a second display of a second user;
detect an input operation, relative to the second display, by the second user, wherein the input operation by the second user results in a change in movement of only a first object displayed in the virtual space;
reflect the change in the movement of the first object in the first image of the virtual space on the first display; and
detect an input operation, relative to the first display which displays the first image reflecting the change in the movement of the first object, by the first user, wherein
the first image has a first display range corresponding to an attention range of the first user, the second image has a second display range, and
the first object, having the changed movement, is caused to be visibly displayed in the first image only after the input operation by the second user and only when the first object is positioned in an overlapping portion of the first and second display ranges.

13. The application control system according to claim 12, wherein
the input operation by the second user that results in the change in the movement of the first object includes selection of an item displayed on the second display,
the item is different from the first object, and
the input operation by the second user results in the change in the movement of only the first object.

* * * * *